United States Patent
Zhang et al.

(10) Patent No.: US 10,061,494 B2
(45) Date of Patent: Aug. 28, 2018

(54) METHOD AND DEVICE FOR WEBPAGE ZOOMING ON ELECTRONIC APPARATUS

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Jiongxuan Zhang, Beijing (CN); Guofeng Fan, Beijing (CN)

(73) Assignees: Beijing Qihoo Technology Company Limited, Beijing (CN); Qizhi Software (Beijing) Company Limited, Beijing (CN)

( * ) Notice: Subject to any disclaimer, the term of this patent is extended or adjusted under 35 U.S.C. 154(b) by 23 days.

(21) Appl. No.: 14/901,512

(22) PCT Filed: Mar. 31, 2014

(86) PCT No.: PCT/CN2014/074454
§ 371 (c)(1),
(2) Date: Dec. 28, 2015

(87) PCT Pub. No.: WO2014/206124
PCT Pub. Date: Dec. 31, 2014

(65) Prior Publication Data
US 2017/0123635 A1    May 4, 2017

(30) Foreign Application Priority Data

Jun. 28, 2013 (CN) .......................... 2013 1 0267927
Jun. 28, 2013 (CN) .......................... 2013 1 0267962
(Continued)

(51) Int. Cl.
*G06F 3/048* (2013.01)
*G06F 3/0484* (2013.01)
(Continued)

(52) U.S. Cl.
CPC ...... *G06F 3/04845* (2013.01); *G06F 3/04847* (2013.01); *G06F 3/04883* (2013.01);
(Continued)

(58) Field of Classification Search
CPC ......... G06F 2203/04806; G06F 3/0488; G06F 2203/04808; G06F 3/048
See application file for complete search history.

(56) References Cited

U.S. PATENT DOCUMENTS 7,743,348 B2 * 6/2010 Robbins ................. G06F 3/0421
715/767
8,217,909 B2 * 7/2012 Young ................... G06F 3/0416
345/173
(Continued)

FOREIGN PATENT DOCUMENTS

CN    102314502 A    1/2012
CN    102566908 A    7/2012
(Continued)

OTHER PUBLICATIONS

Stack Overflow, Dec. 13, 2011, stackoverflow.com, pp. 1-11.*
(Continued)

*Primary Examiner* — Ryan F Pitaro
(74) *Attorney, Agent, or Firm* — Baker & Hostetler LLP

(57) ABSTRACT

Disclosed is a method and device for webpage zooming on an electronic apparatus. The method comprises: constructing a custom zooming processor object and replacing an original zooming processor object with it; inheriting a webpage display control to construct a custom touch event method; detecting an operation of touching an electronic apparatus as an operation of releasing n−1 touch points in n touch points; judging whether a zooming processor object is supported; if supported, the zooming processor object performs operations, in the zooming ending method a webpage text zoom-
(Continued)

ing scale is set to be a display zooming scale of the webpage display control, and executing the zooming ending method; and if not supported, setting the webpage text zooming scale to be the display zooming scale of the webpage display control, reflectively setting and enabling a zooming scale method, and executing a touch event method of the inherited webpage display control.

16 Claims, 12 Drawing Sheets

(30) Foreign Application Priority Data

| Jun. 28, 2013 | (CN) | 2013 1 0268150 |
|---|---|---|
| Jun. 28, 2013 | (CN) | 2013 1 0269018 |
| Jun. 28, 2013 | (CN) | 2013 1 0269384 |
| Jun. 28, 2013 | (CN) | 2013 1 0269405 |
| Jun. 28, 2013 | (CN) | 2013 1 0269588 |
| Jun. 28, 2013 | (CN) | 2013 1 0270415 |

(51) Int. Cl.
    *G06F 9/44* (2018.01)
    *G06F 3/0488* (2013.01)
    *G06F 9/451* (2018.01)

(52) U.S. Cl.
    CPC ............ *G06F 9/4443* (2013.01); *G06F 9/451* (2018.02); *G06F 2203/04806* (2013.01)

(56) References Cited

U.S. PATENT DOCUMENTS

| 2002/0075285 | A1* | 6/2002 | Morrison | G06T 3/40 |
| | | | | 345/660 |
| 2003/0195872 | A1* | 10/2003 | Senn | G06F 17/30864 |
| 2005/0195157 | A1* | 9/2005 | Kramer | G06F 3/04845 |
| | | | | 345/156 |
| 2009/0319888 | A1* | 12/2009 | Oygard | G06F 17/211 |
| | | | | 715/252 |
| 2011/0035701 | A1* | 2/2011 | Williams | G06F 3/0481 |
| | | | | 715/784 |
| 2012/0110438 | A1 | 5/2012 | Peraza et al. | |
| 2013/0132867 | A1* | 5/2013 | Morris | G06F 3/048 |
| | | | | 715/759 |
| 2013/0254139 | A1* | 9/2013 | Lei | G06N 99/005 |
| | | | | 706/11 |
| 2014/0115544 | A1* | 4/2014 | Chi | G06F 3/0488 |
| | | | | 715/863 |
| 2014/0215310 | A1* | 7/2014 | Kim | G06F 3/04883 |
| | | | | 715/234 |
| 2014/0325362 | A1* | 10/2014 | Potts | G06F 17/30058 |
| | | | | 715/732 |
| 2015/0116448 | A1* | 4/2015 | Gottlieb | H04N 21/44008 |
| | | | | 348/14.03 |
| 2016/0189344 | A1* | 6/2016 | Chang | G06F 3/012 |
| | | | | 345/661 |

FOREIGN PATENT DOCUMENTS

| CN | 103324734 A | 9/2013 |
| CN | 103324738 A | 9/2013 |
| CN | 103324741 A | 9/2013 |
| CN | 103324743 A | 9/2013 |
| CN | 103336817 A | 10/2013 |
| CN | 103336818 A | 10/2013 |
| CN | 103336819 A | 10/2013 |
| CN | 103345497 A | 10/2013 |
| WO | WO 2009/053833 A1 | 4/2009 |

OTHER PUBLICATIONS

Android Developers, Jan. 1, 2013, developer.android.com, pp. 1-14.*

B4A Library—WebViewSettings, Dec. 1, 2011, www.b4x.com, pp. 1-8.*

International Patent Application No. PCT/CN2014/074454; Int'l Search Report; dated Jun. 30, 2014; 3 pages.

International Patent Application No. PCT/CN2014/074454; Int'l Written Opinion; dated Jun. 30, 2014; 17 pages.

* cited by examiner

METHOD AND DEVICE FOR WEBPAGE ZOOMING ON ELECTRONIC APPARATUS

CROSS-REFERENCE TO RELATED APPLICATIONS

This application is a national stage of International Application No. PCT/CN2014/074454, filed Mar. 31, 2014, which is based upon and claims priority to Chinese Patent Applications No. CN201310267927.7, No. CN201310268150.6, No. CN201310269018.7, No. CN201310269384.2, No. CN201310269588.6, No. CN201310270415.6, No. CN201310267962.9 and No. CN 201310269405.0 all of which are filed Jun. 28, 2013, the entire contents of all of which are incorporated herein by reference.

FIELD OF TECHNOLOGY

The disclosure relates to the field of webpage display technologies, and in particular to a method for webpage zooming on an electronic apparatus, a device for webpage zooming on an electronic apparatus, a computer program and a computer readable medium.

BACKGROUND

With the continuous development of intellectualization of electronic apparatus, more and more users are inclined to use a browser of electronic apparatus to view webpage and other contents. In the course of viewing the webpage, a scenario of zooming in or zooming out (hereinafter referred to as "zooming") the contents becomes common.

In a scheme of prior art, a display control built in an operating system of electronic apparatus can be employed. For Android system as an example, a zooming function of its built-in WebView control can be enabled to realize the zooming. FIG. 1 is a diagram schematically illustrating a full webpage as shown on an electronic apparatus. By the scheme of prior art, the user may zoom in a certain region of the webpage to clearly see the details thereon. In particular, elements such as pictures and texts may be enlarged in proportion. However, as shown in FIG. 2 which is a diagram schematically illustrating a zoomed-in region on the electronic apparatus, contents outside the region and especially contents which is originally in the region but moved out of the region due to zooming-in cannot be displayed due to excess of a range of screen. Accordingly, by a zooming-out operation, an entire webpage can be clearly seen. In particular, elements such as pictures and texts may be shrunk in proportion. Blank regions due to zooming out may be filled with the contents which are not completely displayed before. However, in this regard, texts become shrunk accordingly, resulting in an inferior readability.

In another scheme of prior art, the zooming function can be realized by modifying a browser kernel component (for example, a WebKit component in Android system) and bonding it into to an application installation package. According to this scheme of prior art, it is possible to re-compose text contents within a specified region when zooming in the region and to display them on the electronic apparatus in a tiled manner, thereby achieving an effect as reading a novel and avoiding that a part of contents could not be display due to zooming in. However, this scheme of prior art has shortages of slow zooming speed, large application installation package (normally, an additional memory space of 5 MB or 6 MB may be needed), and keeping away the new features of the operating system with new version.

Meanwhile, the modification to the browser kernel component may be risky and difficulty in development and adaption may be increased, possibly resulting in a browser breakdown with specific reasons hardly made out.

Moreover, after the webpage zooming, a non-aligned webpage as shown in FIG. 3 sometimes occurs. As shown in FIG. 3, a part of contents on the left side of the webpage is moved out of the screen of the electronic apparatus. At this point, the user may move the webpage contents by touch operations on the electronic apparatus screen to change its display position on the screen. However, with a limited accuracy of manual touch operations, sometimes, it is difficult to completely align a left border of the webpage contents with a left border of the electronic apparatus screen, and it is difficult for the webpage contents to accurately center on the screen. Normally, the touch operations are necessarily performed many times to reach a relatively desirable display effect.

SUMMARY

In the view of above problems, the disclosure is proposed to provide to a method for webpage zooming on an electronic apparatus, a device for webpage zooming on an electronic apparatus, a computer program and a computer readable medium, for overcoming or at least partially solving the problems.

As an aspect according to the disclosure, there is provided a method for webpage zooming on an electronic apparatus, which includes:
  generating an object of inheritance zooming processor class into which an original zooming processor object is delivered, in order to construct a custom zooming processor object and replace the original zooming processor object with the custom zooming processor object;
  inheriting the webpage display control to construct a custom touch event method;
  detecting an operation of touching an electronic apparatus as an operation of releasing n−1 touch points in n touch points, wherein n is an integer which is more than or equal to 2;
  judging whether the zooming processor object is supported by an operating system of the electronic apparatus;
  if it is supported, the zooming processor object performs operations, including a zooming starting method, a zooming process method and a zooming ending method, wherein in the zooming ending method a webpage text zooming scale is set to be a display zooming scale of the webpage display control, and executing the zooming ending method of the original zooming processor object; and
  if it is not supported, setting the webpage text zooming scale to be the display zooming scale of the webpage display control, reflectively setting and enabling a zooming scale method from a zooming manager object for invoking, and executing a touch event method of the inherited webpage display control.

As another aspect according to the disclosure, there is provided an electronic apparatus for webpage zooming, including:
  a memory having instructions stored thereon;
  a processor configured to execute the instructions to perform operations for webpage zooming, comprising:
  generating an object of inheritance zooming processor class into which an original zooming processor object is delivered, in order to construct a custom zooming processor object and replace the original zooming processor object with the custom zooming processor object; inheriting the webpage display control to construct a custom touch event method;

detecting an operation of touching an electronic apparatus as an operation of releasing n−1 touch points in n touch points, wherein n is an integer which is more than or equal to 2; judging whether the zooming processor object is supported by an operating system of the electronic apparatus;

if it is supported, the zooming processor object performs operation, including a zooming starting method, a zooming process method and a zooming ending method, wherein a webpage text zooming scale is set to be a display zooming scale of the webpage display control in the zooming ending method, and executing the zooming ending method of the original zooming processor object; and if it is not supported, setting the webpage text zooming scale to be the display zooming scale of the webpage display control, reflectively setting and enabling a zooming scale method from a zooming manager object for invoking, and executing a touch event method of the inherited webpage display control.

As still another aspect according to the disclosure, there is provided a non-transitory computer readable medium, having computer programs stored thereon that, when executed by one or more processors of an electronic apparatus, cause the electronic apparatus to perform:

generating an object of inheritance zooming processor class into which an original zooming processor object is delivered, in order to construct a custom zooming processor object and replace the original zooming processor object with the custom zooming processor object;

inheriting a webpage display control to construct a custom touch event method;

detecting an operation of touching an electronic apparatus as an operation of releasing n−1 touch points in n touch points, wherein n is an integer which is more than or equal to 2;

judging whether the zooming processor object is supported by an operating system of the electronic apparatus;

if it is supported, the zooming processor object performs operations, including a zooming starting method, a zooming process method and a zooming ending method, wherein in the zooming ending method a webpage text zooming scale is set to be a display zooming scale of the webpage display control, and executing the zooming ending method of the original zooming processor object; and if it is not supported, setting the webpage text zooming scale to be the display zooming scale of the webpage display control, reflectively setting and enabling a zooming scale method from a zooming manager object for invoking, and executing a touch event method of the inherited webpage display control.

The disclosure has following advantages:

As described above, the disclosure provides method and device for webpage zooming on an electronic apparatus. According to the embodiment of the disclosure, it is possible to construct a custom zooming processor object and a custom touch event method, to detect an operation of touching an electronic apparatus as an operation of releasing n−1 touch points in n touch points, to judge whether the zooming processor object is supported by an operating system of the electronic apparatus, to set a webpage text zooming scale to be a display zooming scale of webpage display control in a zooming ending method and execute the zooming ending method of an original zooming processor object if it is supported, or to set a webpage text zooming scale to be a display zooming scale of webpage display control, reflectively set and enable a zooming scale method from a zooming manager object for invoking and execute a touch event method of an inherited webpage display control if it is not supported. As such, functions of re-composing after webpage zooming so that full screen is overspread with contents can be realized while the kernel component (for example, WebKit component in Android system) of browser or other webpage display program are not amended, thereby solving a problem that a portion of contents could not be displayed due to zooming-in. Furthermore, for an electronic apparatus having an operating system which does not support the zooming processor object, the embodiment of the disclosure is also able to complete the function of re-composing after zooming, thereby realizing a support for almost all the electronic apparatuses. Meanwhile, according to the embodiment of the disclosure, it is possible to take full advantage of new features from an operating system having new version. For example, by taking advantage of a hardware acceleration function in Android 4.0 or higher versions, a zooming speed can be significantly improved and characteristics such as a superior webpage viewing feature in Android 4.0 or higher versions can be used. In addition, since there is no need to modify the kernel component of browser or other webpage display programs, memory space of the electronic apparatus can be saved while a risk of modifying the kernel component of browser can be eliminated. In addition, according to the embodiment of the disclosure, it is possible to construct a custom webpage render processor object, to obtain a pixel value of left border of webpage contents in the case that the webpage zooming is performed, and to move the webpage contents according to the pixel value of left border of webpage contents, whereby the webpage contents can be automatically moved after webpage zooming, such that the left border of webpage contents is aligned with the left border of electronic apparatus screen to allow the screen to be overspread with the webpage contents. Therefore, it is possible to make a use of a display space of screen to reach a desirable display effect. According to the disclosure, automatic alignment after webpage zooming can be realized without manual intervention while avoiding problems that manual adjustment is so inaccurate that a desirable display effect could not be realized. Moreover, by making a use of the operations of the pixel value, the second pixel value and the reference pixel value of left border of webpage contents, it is possible to furthest overcome problems that a webpage content correlative area could not be found since the pixel value of left border of webpage contents of some operating systems is less than zero, thereby realizing a support for almost all the operating systems.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the invention. Further, throughout the drawings, same elements are indicated by same reference numbers. In the drawings:

Figure 2:
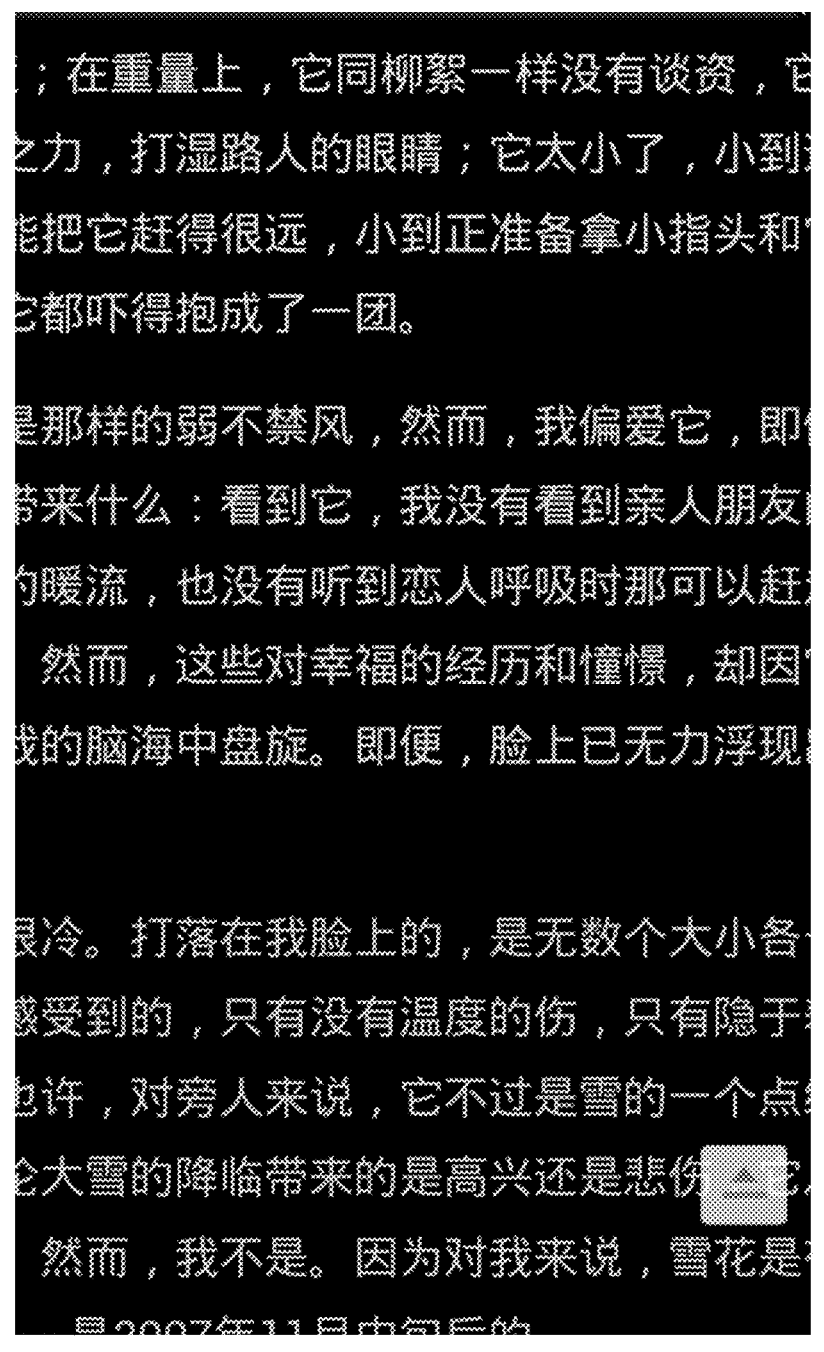

FIG. 2 is a diagram schematically illustrating a zoomed-in region on the electronic apparatus;

FIG. 11 is a diagram schematically illustrating an aligned webpage after webpage zooming on an electronic apparatus according to an embodiment of the disclosure;

DESCRIPTION OF THE EMBODIMENTS

Exemplary embodiments of the present disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be understood thoroughly and completely and will fully convey the scope of the disclosure to those skilled in the art.

Figure 1:
FIG. 1 is a diagram schematically illustrating a full webpage as shown on an electronic apparatus.
Figure 3:
FIG. 3 is a diagram schematically illustrating an unaligned webpage after webpage zooming on the electronic apparatus.
Figure 4:
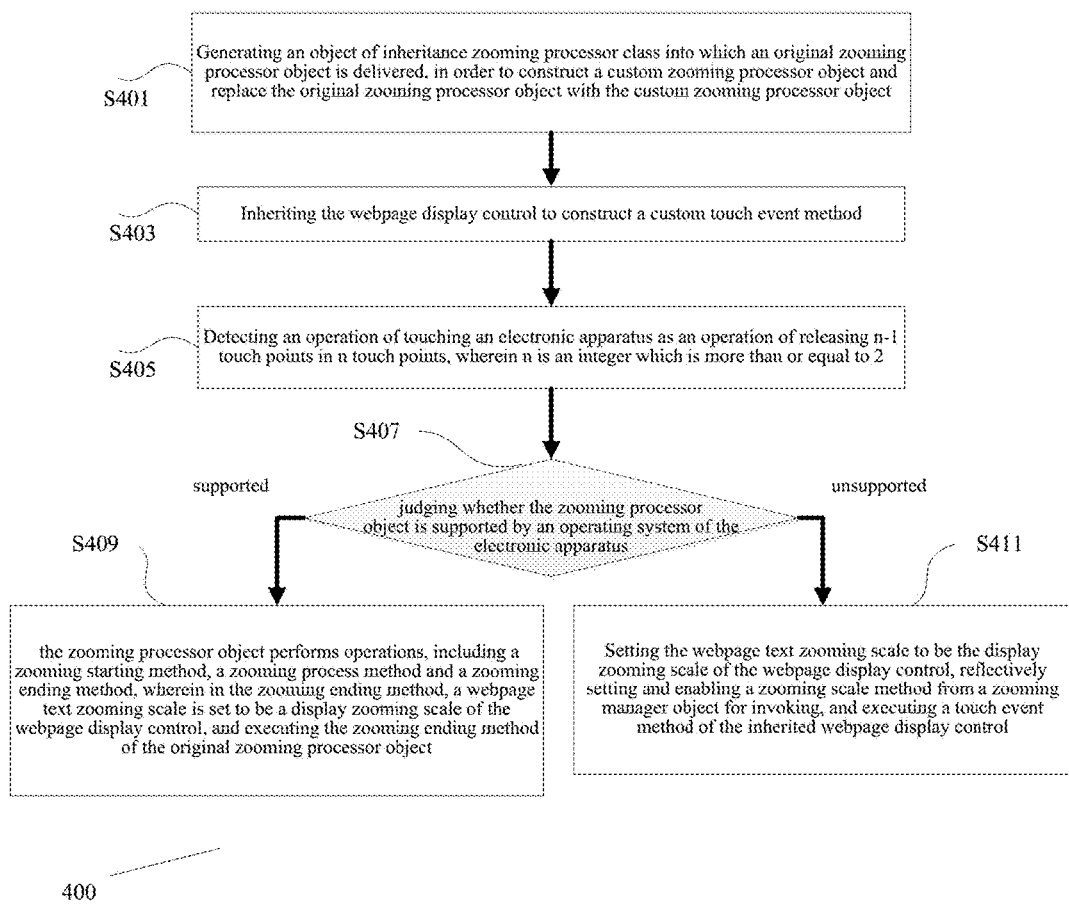
FIG. 4 is a flow chart schematically illustrating a method for webpage zooming on an electronic apparatus according to an embodiment of the disclosure.

FIG. 4 is a flow chart schematically illustrating a method 400 for webpage zooming and aligning on an electronic apparatus according to an embodiment of the disclosure.

The principle of the disclosure is applicable to any electronic apparatuses having display unit, including but not limited to computer based on desktop operating system such as Windows, Linux, Mac OS and Unix; mobile phone, tablet, video player, e-book reader and digital photo frame based on mobile operating system such as iOS, Android, Windows Phone and Symbian. Hereinafter, the principle of the disclosure will be exemplarily described by way of an electronic apparatus with Android system for example. However, the specific example is provided merely for the illustrative purpose of the disclosure to help a reader understand the principle of the disclosure. The scope of the disclosure should be limited thereto but could be applicable to any electronic apparatuses having display unit based on any operating systems.

In the following description, "zooming" all refers to "zooming out or zooming in".

According to the embodiment of the disclosure, webpage contents may include not only text contents but also other contents such as image, video, etc.

As shown in FIG. 4, the method 400 for webpage zooming and aligning on an electronic apparatus according to the embodiment of the disclosure starts with Step S401. At Step S401, generating an object of inheritance zooming processor class into which an original zooming processor object is delivered, in order to construct a custom zooming processor object and replace the original zooming processor object with the custom zooming processor object.

Optionally, according to the embodiment of the disclosure, prior to Step S401, the method 400 may further include Step S401', obtaining the original zooming processor object.

According to the embodiment of the disclosure, in the case that the operating system of electronic apparatus is Android 2.3.x (for example, Android 2.3.7) or lower versions, a zooming detector object may be reflected and obtained from a webpage display control, and an original zooming processor object may be reflected and obtained from the zooming detector object. According to the embodiment of the disclosure, the webpage display control may be a WebView control of Android system, for example. The scope of the disclosure is not limited thereto, and the webpage display control could be any controls capable of realizing a webpage display function, such as UIWebView control of iOS system. Optionally, for Android system, the zooming processor object could be an mListener object, and the zooming detector object could be an mScaleDetector object that belongs to a ScaleGestureDetector class. Of course, these examples are provided merely for illustrating the principle of the disclosure and the scope of the disclosure is not limited thereto.

According to the embodiment of the disclosure, the zooming processor object is a module invoked when the zooming operation is performed for a certain control. The zooming processor object in Android system (mListener object) is an object of zooming processor class (OnScaleGestureListener class) which includes the zooming starting method, the zooming process method and the zooming ending method. For the mListener object, they are an onScaleBegin method, an onScale method and an onScaleEnd method, respectively. Taking a scenario in which a user makes zooming with two fingers on the touch screen of electronic apparatus as an example, when the user is ready for zooming with two fingers, i.e., the user puts down two fingers and starts to drag, the zooming starting method of the zooming processor object can be invoked; when the user is making zooming, the zooming process method of the zooming processor object can be invoked; when the user looses at least one of two fingers, it may suggest the zooming is completed and the zooming ending method of zooming processor object can be invoked. Each of zooming supportable controls, including WebView control, can realize its own zooming processor object.

In addition, reflection operations can be performed by using reflex mechanism provided in Java language and .Net language. Attribute of methods and objects can be temporarily changed from private attribute to public attribute for direct use and modification. It could be appreciated by those skilled in the art, other programming languages also can be used to temporarily change the attribute of methods and objects from private attribute to public attribute in a similar manner for reaching the purpose of reflection operation.

For Android system, a version number of Android system can be obtained by obtaining a Build.VERSION.SDK_INT object.

According to the embodiment of the disclosure, in the case that the operating system of electronic apparatus is Android 4.0 or higher versions, a zooming manager object can be reflected and obtained from the webpage display control, a zooming detector object can be reflected and obtained from the zooming manager, and a original zooming processor object can be reflected and obtained from the zooming detector object. In the contexts, for Android system, the zooming manager object could be an mZoomManager object which can be directly or indirectly invoked by the WebView control. As such, the zooming operations can be separated from originally complex WebView control as a relatively independent module which can be used by the WebView control (or even other controls). In the contexts, for Android 2.3.x or lower versions, Java class is a WebView control class, which is a WebView class; while, for Android 3.0 and later versions, the object is an object of Java class directly used by the WebView control, which is an object of ZoomManager class.

According to the embodiment of the disclosure, at Step S401 as described above, an object of inheritance zooming processor class into which an original zooming processor object is delivered may be generated, in order to construct a custom zooming processor object and replace the original zooming processor object with the custom zooming processor object.

According to the embodiment of the disclosure, at Step S401, it is possible to generate an object which is allowed to inherit the zooming processor class. In Android system, the zooming processor class is an OnScaleGestureListener class. As such, the object can realize its own zooming starting method, zooming process method and zooming ending method. Then, the original zooming processor object is necessarily delivered into this object to construct the custom zooming processor object. As such, after use of the custom zooming processor object, it is also possible to invoke the original zooming processor object of system. At Step S401, after replacing the original zooming processor object with the custom zooming processor object, a value of variable "whether to support zooming processor object" can be set to be "true".

As shown in FIG. 4, following Step S401, Step S403 is executed, which includes: inheriting the webpage display control to construct a custom touch event method. According to the embodiment of the disclosure, the touch event method, for example, could be an onTouchEvent method and/or a dispatchTouchEvent method in Android system. For any touch operations on a certain control by the user, Android system may trigger a touch processing event of this control. The onTouchEvent method and the dispatchTouchEvent method may have a parameter which is used to describe user's current touch conditions. In Android system, it is a MotionEvent object that is used, for example, to describe the number of user's current touch points, corresponding coordinates and touch conditions such as "moving", "pressing", "releasing", etc.

According to the embodiment of the disclosure, at Step S403 as set forth, it is possible to generate an object which is allowed to inherit the webpage display control, in order to construct its own custom touch event method, such as onTouchEvent method and di spatchTouchEvent method.

As shown in FIG. 4, next Step S405 is executed, which includes: detecting an operation of touching an electronic apparatus as an operation of releasing n−1 touch points in n touch points, wherein n is an integer which is more than or equal to 2.

In the case of n=2 for example, i.e., assuming that the user touches the touch screen of the electronic apparatus with two fingers, when one of fingers is released, a touch processing event method may be triggered.

According to the embodiment of the disclosure, at Step S405, for Android system, ACTION_POINTER_UP object or ACTION_POINTER_n_UP object may be used to detect whether n−1 touch points in n touch points are released to trigger the touch event method.

When the operation of touching the electronic apparatus as the operation of releasing n−1 touch points in n touch points is detected, then Step S407 is subsequently executed, which includes: judging whether the zooming processor object is supported by an operating system of the electronic apparatus.

For Android system, the zooming processor object could be an mListener object which is a module invoked when the zooming operation is performed for a certain control. The mListener object in Android system is an object of the zooming processor class (OnScaleGestureListener class), which includes a zooming starting method, a zooming process method and a zooming ending method. For the mListener object, they are an onScaleBegin method, an onScale method and an onScaleEnd method, respectively. Taking a scenario in which a user makes zooming with two fingers on the touch screen of electronic apparatus as an example, when the user is ready for zooming with two fingers, i.e., the user puts down two fingers and starts to drag, the zooming starting method of the zooming processor object can be invoked; when the user is making zooming, the zooming process method of the zooming processor object can be invoked; when the user looses two fingers, it may suggest the zooming is completed and the zooming ending method of zooming processor object can be invoked. Each of zooming supportable controls, including WebView control, can realize its own zooming processor object.

When it is judged, at Step S407, that the operating system of the electronic apparatus supports the zooming processor object, Step S409 may be executed, which includes: the zooming processor object performs operations, including a zooming starting method, a zooming process method and a zooming ending method, wherein in the zooming ending method, a webpage text zooming scale is set to be a display zooming scale of the webpage display control, and executing the zooming ending method of the original zooming processor object.

According to the embodiment of the disclosure, at Step S409 of setting the webpage text zooming scale to be the display zooming scale of the webpage display control, in the case that the operating system of electronic apparatus is Android 2.3.x or lower versions, a text zooming scale object can be reflected from the webpage display control and the value of the display zooming scale of the webpage display control could be assigned to the text zooming scale object; in the case that the operating system of electronic apparatus is Android 4.0 or higher versions, a text zooming scale object can be reflected from the zooming manager object and the value of the display zooming scale of the webpage display control is assigned to the text zooming scale object.

According to the embodiment of the disclosure, in Android system, the text zooming scale object could be an mTextWrapScale object. The assignment of the display zooming scale of the webpage display control to the text zooming scale object means the value of the text zooming scale of text zooming scale object is equalized to the value of the display zooming scale of the webpage display control. In the contexts, the text zooming scale indicates "webpage width"/"text width", the display zooming scale indicates "webpage width"/"screen width". When the value of the text zooming scale is equal to the value of the display zooming scale, the text width is equal to the webpage width accordingly such that the texts are displayed in full screen. For example, if the text zooming scale is 2 while the display zooming scale of the WebView control is 1, it may be indicated a ratio of texts to screen is 1/2; if the display scale of the WebView control is 1 while the text zooming scale is 1, it may be indicated a ratio of texts to screen is 1/1, which means a full-screen. In addition, even if the user slides the screen by touch operations in the use to move the text part out of the screen (for example, slide to rightmost until the texts are all moved out of screen), since the text zooming scale is unchanged, when the user slides the texts back by touch operations, the full screen is certain to be overspread with texts once the left border of texts is aligned with the left border of electronic apparatus screen.

According to the embodiment of the disclosure, the method 400 for webpage zooming and aligning on the electronic apparatus may further include a following step: in the zooming starting method at Step S409, prohibiting simultaneous operation of zooming and dragging and executing the zooming starting method of the original zooming processor object. In the contexts, in the case that the operating system of electronic apparatus is Android 2.3.x or higher versions, an mAllowPanAndScale object can be obtained from the zooming manager object by reflecting and a value of the mAllowPanAndScale object can be set to be "false". The mAllowPanAndScale object is used to indicate whether to allow for changing the zooming midpoint. For example, when two fingers drag in the course of zooming with two fingers, the entire contents can be moved; its value which is set to be "false" means to disable this function, so as to ensure no rotation in the course of zooming.

According to the embodiment of the disclosure, the method 400 for webpage zooming and aligning on the electronic apparatus may further include a following step: in the zooming process method at Step S409, executing the zooming process method of the original zooming processor object.

According to the embodiment of the disclosure, the method 400 for webpage zooming and aligning on the electronic apparatus may further include a following step: in the zooming ending method at Step S409, judging whether the webpage supports zooming function.

Figure 5:
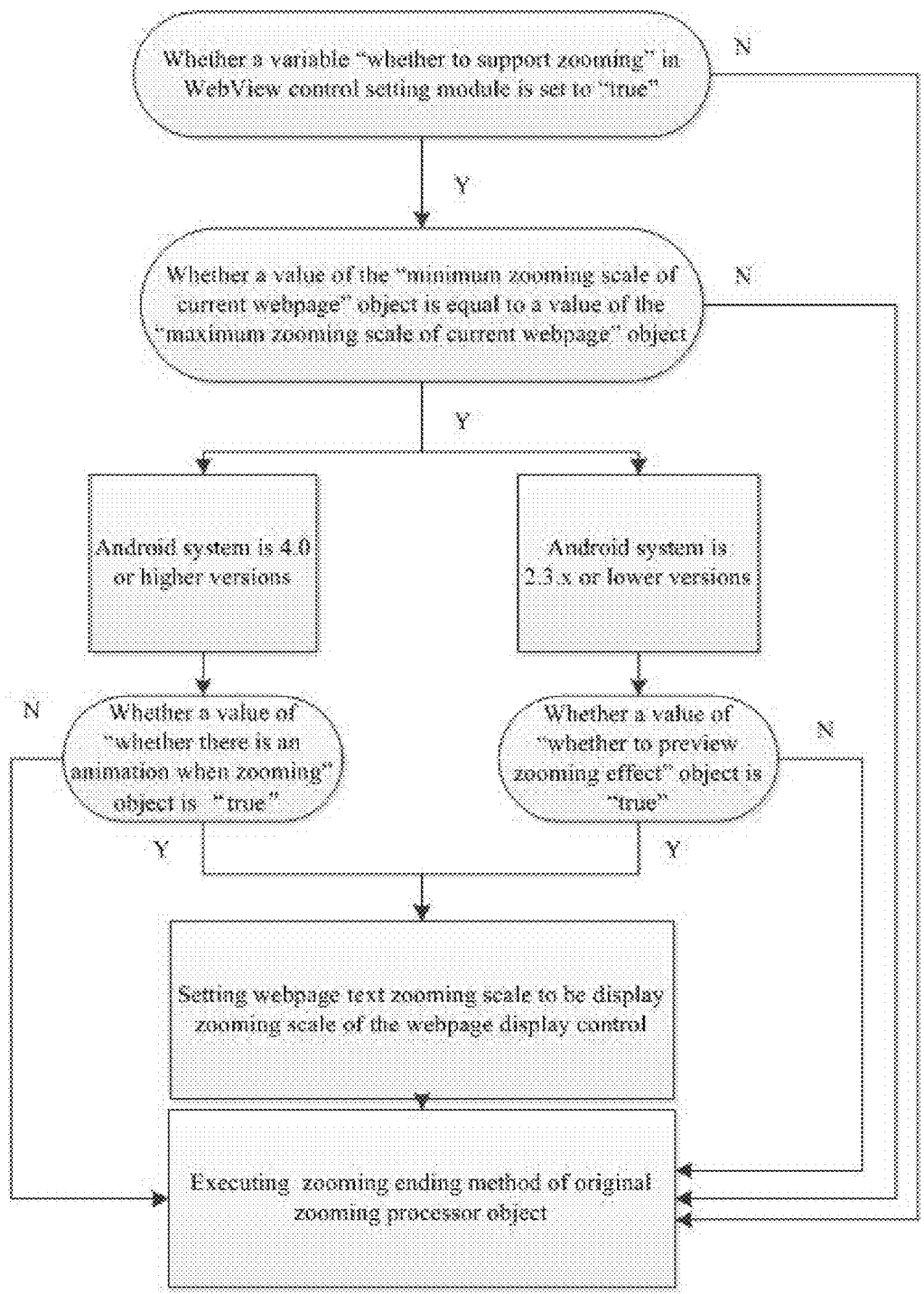
FIG. 5 is a flow chart schematically illustrating a zooming ending method according to an embodiment of the disclosure.

FIG. 5 is a flow chart schematically illustrating a zooming ending method according to an embodiment of the disclosure. Various optional steps in the zooming ending method will be described in connection with FIG. 5.

Optionally, as shown in FIG. 5, the foresaid judging step can be realized in a following manner: obtaining a variable "whether to support zooming" in a WebView control setting module (WebSettings object in Android system), which has a Boolean value wherein "true" indicates "support for zooming function" and "false" indicates "no support for zooming function" to close the judging step; to complete obtaining operation, reflecting a "minimum zooming scale of current webpage" object and a "maximum zooming scale of current webpage" object from the zooming manager object, which are an mMinZoomScale object and an mMaxZoomScale object in Android system, respectively. Usually, a part of source codes (invisible to users) of the webpage may be used to advise of a zooming scale range of the webpage, the value of which is not public usually and thus is necessarily obtained by reflection; then, it is possible to compare whether a value of the "minimum zooming scale of current webpage" object is equal to a value of the "maximum zooming scale of current webpage" object, if equal, then directly return "false" which indicates the webpage does not support the zooming function, and if not equal, then return "true", which indicates the value of the variable "whether to support zooming function" is "true" and the webpage supports the zooming function.

In the case that the webpage does not support the zooming function, it is possible to directly execute the zooming ending method of the original zooming processor object.

In the case that the webpage supports the zooming function, a version of Android system is judged.

As shown in FIG. 5, in the case that Android system is 4.0 or higher versions, a "whether there is an animation when zooming" object (in Android system, an mPinchToZoomAnimating object) in the zooming manager object can be obtained through the reflex mechanism provided by Java. This object has a Boolean value, wherein if its value is "false", then it may be possible to directly execute the zooming ending method of the original zooming processor object; if its value is "true", then it may be possible to execute the step of setting the webpage text zooming scale to be the display zooming scale of the webpage display control as described above, and to execute the zooming ending method of the original zooming processor object.

As shown in FIG. 5, in the case that Android system is 2.3.x or lower versions, a "whether to preview zooming effect" object can be reflected from the zooming manager object to complete an obtaining operation. In Android system, the object could be an mPreviewZoomOnly object, wherein if a valve of the object is "true", then it is possible to execute the step of setting the webpage text zooming scale to be the display zooming scale of the webpage display control as described above and to execute the zooming ending method of the original zooming processor object; if a valve of the object is "false", then it is possible to directly execute the zooming ending method of the original zooming processor object.

When it is judged, at Step S407, that the operating system of the electronic apparatus does not support zooming processor object, Step S411 may be executed, which includes: setting the webpage text zooming scale to be the display zooming scale of the webpage display control, reflectively setting and enabling a zooming scale method from a zooming manager object for invoking, and executing a touch event method of the inherited webpage display control.

Similarly, according to the embodiment of the disclosure, at Step S411, in the case that the operating system of electronic apparatus is Android 2.3.x or lower versions, a text zooming scale object can be reflected from the webpage display control, and a value of the display zooming scale of the webpage display control is assigned to the text zooming scale object.

In addition, for Android system, a version number of Android system can be obtained by obtaining a Build.VERSION.SDK_INT object.

In the case that the operating system of electronic apparatus is Android 4.0 or higher versions, a text zooming scale object can be reflected from the zooming manager object, and a value of the display zooming scale of the webpage display control could be assigned to the text zooming scale object.

Subsequently, at Step S411, it is possible to reflectively set and enable a zooming scale method from the zooming manager object for invoking, and execute the touch event method of the inherited webpage display control. In addition, where, at Step S405, an operation of touching the electronic apparatus as an operation of releasing n−1 touch points in n touch points is not detected, it is possible to directly execute the touch event method of the inherited webpage display control.

According to the embodiment of the disclosure, for Android system, the setting and enabling zooming scale method could be a setZoomScale method or a setNewZoomScale method. Parameters delivered when invoking at Step S411 may include: the webpage text zooming scale which is set to be the display zooming scale of the webpage display control, an allowance for text composition (set to be "true") and an allowance for compulsive text composition (set to be "true").

After the setting and enabling zooming scale method is invoked, it is possible to execute the touch event method of the inherited webpage display control, i.e., original touch event method, and for Android system, that is to invoke the onTouchEvent method and the dispatchTouchEvent method of its parent class. As such, functions of re-composing after webpage zooming so that full screen is overspread with contents can be realized.

Optionally, according to the embodiment of the disclosure, the method 400 for webpage zooming on the electronic apparatus may further include: prior to Step S409 or Step S411 of setting the webpage text zooming scale to be the display zooming scale of the webpage display control, setting the value of whether to enable widescreen viewing object to be "false". For Android system, the whether to enable widescreen viewing object could be a setUseWideViewPort object, a value of which is stored in a WebView control setting module (in Android system, a WebSettings object). By this operation, the user can be prevented from moving the webpage by touching the screen of electronic apparatus after the display scale zooms in.

Optionally, according to the embodiment of the disclosure, the method 400 for webpage zooming on the electronic apparatus may further include: prior to Step S409 of executing the zooming ending method of the original zooming processor object or Step S411 of executing the touch event method of the inherited webpage display control, setting the value of the whether to enable widescreen viewing object to be "true". By this operation, the function of moving webpage by touch operations can be restored after texts are re-composed.

Additionally and optionally, as shown in FIG. 5, prior to Step S405 as described above, the method 400 for webpage zooming and aligning on the electronic apparatus may further include: judging whether the number of current touch points is more than 1 and judging whether the webpage supports the zooming function. In above two steps, if either one of the judgment results is NO, no further processing will occur and Step S411 of executing the touch event method of the inherited webpage display control will be directly executed.

Optionally, the step of judging whether the webpage supports the zooming function may be realized in a following manner: obtaining a variable "whether to support zooming" in a WebView control setting module (WebSettings object in Android system), which has a Boolean value wherein "true" indicates "support for zooming function" and "false" indicates "no support for zooming function" to close the judging step; to complete obtaining operation, reflecting a "minimum zooming scale of current webpage" object and a "maximum zooming scale of current webpage" object from the zooming manager object, which are an mMinZoomScale object and an mMaxZoomScale object in Android system, respectively. Usually, a part of source codes (invisible to users) of the webpage may be used to advise of a zooming scale range of the webpage, the value of which is not public usually and thus is necessarily obtained by reflection; then, it is possible to compare whether a value of the "minimum zooming scale of current webpage" object is equal to a value of the "maximum zooming scale of current webpage" object, if equal, then directly return "false" which indicates the webpage does not support the zooming function, and if not equal, then return "true", which indicates the value of the variable "whether to support zooming function" is "true" and the webpage supports the zooming function.

Figure 6:
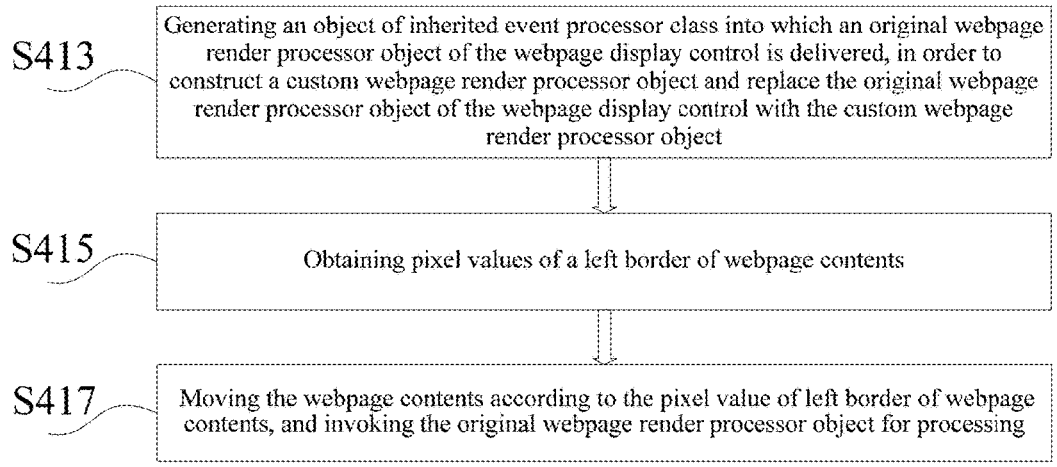
FIG. 6 is a flow chart schematically illustrating steps involved in aligning after webpage zooming according to an embodiment of the disclosure.

After Step S409 or Step S411, the webpage zooming function according to the disclosure can be realized. Optionally, additionally, the disclosure may further include a step of aligning after the webpage zooming. FIG. 6 is a flow chart schematically illustrating steps involved in aligning after webpage zooming according to an embodiment of the disclosure. As shown in FIG. 6, Step S413 is first executed, which includes: generating an object of inherited event processor class into which an original webpage render processor object of the webpage display control is delivered, in order to construct a custom webpage render processor object and replace the original webpage render processor object of the webpage display control with the custom webpage render processor object.

Optionally, according to the embodiment of the disclosure, prior to Step S413, the method 400 may further include Step S412, obtaining the original webpage render processor object of the webpage display control.

According to the embodiment of the disclosure, for Android system, the webpage render processor object could be an mPrivateHandler object. However, the scope of the disclosure is not limited thereto and it may also be for example WindowMessages in Windows system or similar modules in other systems. For Android system, the webpage render processor object is a processing module for sending messages from browser kernel component WebKit to WebView. In Android system, it is realized in a Handler manner and plays a role in receiving a message event. Since WebView is simply used to display and receive a touch event while substantial operations are all completed in the WebKit component, when the WebKit component finishes processing, it may sent one or more piece of notification to the WebView control to realize instant refreshing and processing. The webpage render processor object has only one method, which is a message receiving method. For Android system, it is a handleMessage method which is invoked by the system and an occurrence condition of which would be: WebView receives a message from WebKit. According to the embodiment of the disclosure, at Step S405 as described above, the original webpage render processor object may be reflected from the webpage display control to obtain the original webpage render processor object.

Next, at Step S413, an object of inherited event processor class into which the original webpage render processor object of the webpage display control is delivered may be generated, in order to construct a custom webpage render processor object and replace the original webpage render processor object of the webpage display control with the custom webpage render processor object.

According to the embodiment of the disclosure, at Step S413, it is possible to generate an object which is allowed to inherit the object of event processor class. For example, for Android system, the event processor class is a Handler class. As such, the object can realize its own message receiving method (for Android system, a handleMessage method). Then, the original webpage render processor object is necessarily delivered into this object to construct a custom webpage render processor object. As such, after use of the custom webpage render processor object, it is also possible to invoke the original webpage render processor object of the system. In the end, the original webpage render processor object of the webpage display control is replaced with the custom webpage render processor object.

Following Step S413, Step S415 is executed, which includes: obtaining pixel values of a left border of webpage contents.

According to the embodiment of the disclosure, a horizontal coordinate pixel value of the zooming midpoint in the webpage and its vertical coordinate pixel value in the webpage could be a horizontal coordinate pixel value of the zooming midpoint in the webpage and its vertical coordinate pixel value in the webpage at the end of webpage zooming operation. The display zooming scale could be a display zooming scale after zooming. Therefore, as parameters, the horizontal coordinate pixel value of the zooming midpoint in the webpage and its vertical coordinate pixel value in the webpage at the end of webpage zooming operation, and the display zooming scale after zooming, can be delivered into the webpage content left border pixel value obtaining method to obtain a first pixel value of the left border of webpage contents. According to the embodiment of the disclosure, it is possible to obtain the first pixel value after a webpage refreshing message is received. According to the embodiment of the disclosure, at Step S415, it is necessary to judge whether the webpage refreshing message is received. In general, the WebView control may receive the webpage refreshing message each time the webpage is changed, whether the changes is from user's operation, animation of webpage or script of webpage as long as webpage contents are changed on the screen. Usually, every 2-3 seconds, or when the user operates in the webpage or the webpage itself is changed, the webpage refreshing message may be invoked 1-10 times. In Android system, the webpage refreshing message is numbered 105, named "NEW_PICTURE_MSG_ID", and it may have somewhat different numbers in other systems. According to the embodiment of the disclosure, after the webpage refreshing message is received and when a next webpage refreshing message is received, an aligning operation according to the disclosure is started to perform, and in Android system, that is to use a post method of Handler. This is because, if the aligning operation is performed each time the webpage refreshing message is received, efficiency of refreshing the webpage by previous webpage zooming operation may be influenced. Therefore, it is desirable to perform the aligning operation when a next webpage refreshing message is received (no more than 10 ms).

Figure 7:
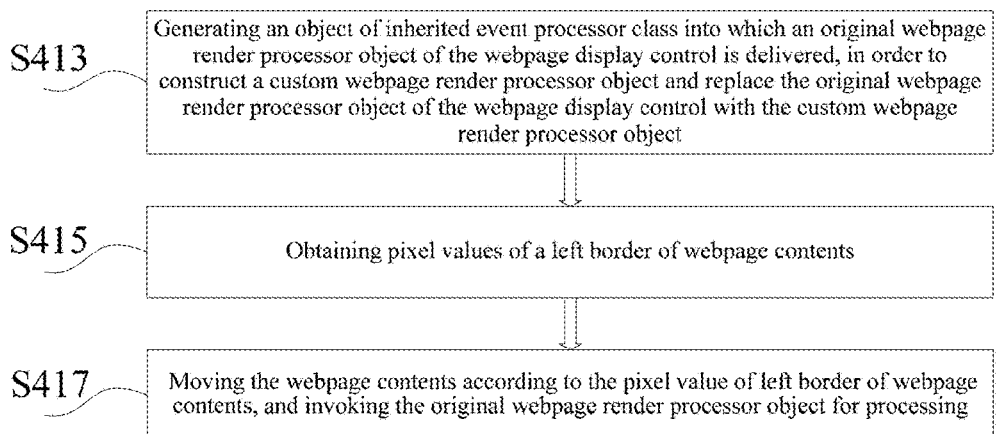
FIG. 7 is a flow chart schematically illustrating steps of obtaining pixel values according to an embodiment of the disclosure.

According to the embodiment of the disclosure, Step S415 of obtaining the pixel values of left border of webpage contents, as described above, may include Sub-Step S415a, S415b, S415c, S415d and S415e. FIG. 7 is a flow chart schematically illustrating sub-steps in the step of obtaining pixel values on left border of webpage contents according to the embodiment of the disclosure.

As shown in FIG. 7, at Sub-Step S415a, reflecting a zooming midpoint horizontal-coordinate pixel value method and a zooming midpoint vertical-coordinate pixel value method from the zooming manager object, in order to obtain horizontal/vertical coordinate pixel values of a view where the zooming midpoint is located.

According to the embodiment of the disclosure, for Android system, the zooming manager object could be an mZoomManager object which can be directly or indirectly invoked by the WebView control. As such, the zooming operations can be separated from originally complex WebView control as a relatively independent module which can be used by the WebView control (or even other controls). In the contexts, for Android 2.3.x or lower versions, Java class is a WebView control class, which is a WebView class; while, for Android 3.0 and later versions, the object is an object of Java class directly used by the WebView control, which is an object of ZoomManager class. For Android system, the zooming midpoint horizontal-coordinate pixel value method could be an mZoomCenterX method, and the zooming midpoint vertical-coordinate pixel value method could be an mZoomCenterY method.

Figure 8:
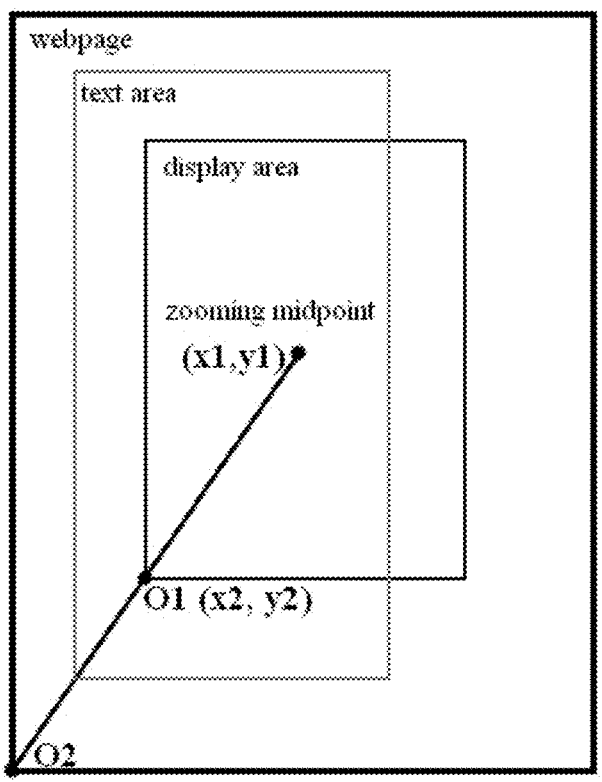
FIG. 8 is a diagram schematically illustrating a relative position of a zooming midpoint in webpage and visual area according to an embodiment of the disclosure.

FIG. 8 is a diagram schematically illustrating a relative position of a zooming midpoint in webpage and visual area according to an embodiment of the disclosure. At Sub-Step S415a, the horizontal/vertical coordinate pixel values of the view where the zooming midpoint is located can be obtained. As shown in FIG. 8, horizontal/vertical coordinate pixel values (x1, y1) of the zooming midpoint with respect to a lower left vertex O1 of display area can be obtained.

Figure 9:
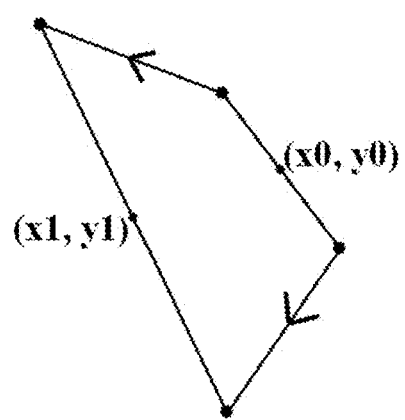
FIG. 9 is a diagram schematically illustrating the zooming midpoint at the start of zooming operation and at zooming operation ending according to an embodiment of the disclosure.

FIG. 9 is a diagram schematically illustrating the zooming midpoint at the start of zooming operation and at zooming operation ending according to an embodiment of the disclosure. As shown in FIG. 9, a location coordinate of the zooming midpoint at the start of zooming operation is (x0, y0), while a location coordinate of the zooming midpoint at zooming operation ending is (x1, y1). At Step S415, the zooming midpoint could be a zooming midpoint at zooming operation ending, i.e., (x1, y1) in FIG. 9.

As shown in FIG. 7, next, at Sub-Step S415b, invoking a visual area horizontal-coordinate pixel value obtaining method and a visual area vertical-coordinate pixel value obtaining method of the webpage display control, to obtain horizontal/vertical coordinate pixel values of a lower left vertex of visual area in the webpage. According to the embodiment of the disclosure, the visual area horizontal-coordinate pixel value obtaining method could be a getScrollX method, and the visual area vertical-coordinate pixel value obtaining method could be a getScrollY method. As shown in FIG. 8, at Sub-Step S415b, it is desirable to obtain horizontal/vertical coordinate pixel values (x2, y2) of the lower left vertex O1 of display area with respect to a lower left vertex O2 of webpage.

As shown in FIG. 7, subsequently, Sub-Step S415c is executed, which includes: reflecting a content horizontal-coordinate pixel value obtaining method and a content vertical-coordinate pixel value obtaining method from the webpage display control, adding the horizontal/vertical coordinate pixel values of the view where the zooming midpoint is located to the horizontal/vertical coordinate pixel values of the lower left vertex of visual area in the webpage, respectively, and delivering them as parameter to the content horizontal-coordinate pixel value obtaining method and the content vertical-coordinate pixel value obtaining method, in order to obtain a horizontal coordinate pixel value of the zooming midpoint in the webpage and a vertical coordinate pixel value of the zooming midpoint in the webpage.

According to the embodiment of the disclosure, for Android system, the content horizontal-coordinate pixel value obtaining method could be a viewToContentX method, and the content vertical-coordinate pixel value obtaining method could be a viewToContentY method. At Sub-Step S415c, the horizontal/vertical coordinate pixel values of the view where the zooming midpoint is located and the horizontal/vertical coordinate pixel values of the lower left vertex of visual area in the webpage can be added up, respectively, to obtain the horizontal/vertical coordinate pixel values (x1+x2, y1+y2), i.e., horizontal/vertical coordinate pixel values of zooming midpoint with respect to the lower left vertex O2 of the webpage, which could be the horizontal coordinate pixel value of the zooming midpoint in the webpage and the vertical coordinate pixel value of the zooming midpoint in the webpage. By delivering (x1+x2, y1+y2) as a parameter into the content horizontal-coordinate pixel value obtaining method and the content vertical-coordinate pixel value obtaining method, the pixels of some margins and scroll bars can be removed to obtain a more accurate positional representation.

As shown in FIG. 7, subsequently, Sub-Step S415d is executed, which includes: invoking a display zooming scale obtaining method of the webpage display control to obtain a display zooming scale (for example, a display zooming scale after zooming). According to the embodiment of the disclosure, for Android system, the display zooming scale obtaining method could be a getScale method. At Sub-Step S415d, it may be desirable to obtain the display zooming scale at the end of zooming.

As shown in FIG. 7, next, Sub-Step S415e is executed, which includes: delivering the horizontal coordinate pixel value of the zooming midpoint in the webpage, the vertical coordinate pixel value of the zooming midpoint in the webpage and the display zooming scale after zooming, as parameters, into a webpage content left border pixel value obtaining method, in order to obtain pixel values of the left border of the webpage contents. As described above, in the case that the horizontal coordinate pixel value of the zooming midpoint in the webpage and its vertical coordinate pixel value in the webpage are a horizontal coordinate pixel value of the zooming midpoint in the webpage and its vertical coordinate pixel value in the webpage at the end of webpage zooming operation, respectively, and the display zooming scale is a display zooming scale after zooming, a first pixel value of left border of webpage contents is obtained at this point.

According to the embodiment of the disclosure, for Android system, the webpage content left border pixel value obtaining method could be a getBlockLeftEdge method or a nativeGetBlockLeftEdge method. For Android 4.1.x or higher versions, the getBlockLeftEdge method can be used, while for Android 4.1.x or lower versions, the nativeGetBlockLeftEdge method can be used. For Android system, a version number of Android system can be obtained by obtaining a Build.VERSION.SDK_INT object.

At Sub-Step S415e, as parameters, the horizontal/vertical coordinate pixel values (x1+x2, y1+y2) and the display zooming scale after zooming can be delivered into the getBlockLeftEdge method or the nativeGetBlockLeftEdge method. In the case that a returned pixel value of left border of webpage contents is negative, it may be indicated no pixel value of left border of webpage contents is obtained such that the aligning operation could not be executed. In this regard, it is possible to discard the pixel value. In the case that a returned pixel value of left border of webpage contents is positive or zero, it may be indicated a pixel value of left border of webpage contents has been obtained.

Following Step S415, Step S417 is executed, which includes: moving the webpage contents according to the pixel value of left border of webpage contents, and invoking the original webpage render processor object for processing. According to the embodiment of the disclosure, as parameters, the stored pixel value of left border of webpage contents (for example, the foregoing first pixel value), the display zooming scale (for example, the foregoing display zooming scale after zooming) and the vertical coordinate pixel value of the lower left vertex of visual area in the webpage (i.e., the foregoing y2) can be delivered into a visual area moving method, in order to move the webpage contents in a horizontal direction. That is, the position of the visual area is adjusted only in a horizontal direction, while it is kept unchanged in a vertical direction. For Android system, the visual area moving method could be a scrollTo method or a pinScrollTo method.

According to the embodiment of the disclosure, at Step S417, it is possible to subtract a predefined pixel value from the stored pixel value of left border of webpage contents to obtain a revised pixel value of left border of webpage contents, and deliver, as parameters, the revised pixel value, the display zooming scale after zooming and the vertical coordinate pixel value of the lower left vertex of visual area in the webpage into the visual area moving method in order to move the webpage contents in a horizontal direction. The step of subtracting the predefined pixel value from the pixel value of left border of webpage contents is used to ensure a normal alignment. The predefined pixel value can be selected dependently on actual demand, for example, 5 pixels. That is, 5 pixels are subtracted from the stored pixel value of left border of webpage contents to obtain the revised pixel value of left border of webpage contents. According to the embodiment of the disclosure, when the revised pixel value is less than zero, the revised pixel value may be set to zero. Then, as parameters, the revised pixel value, the display zooming scale after zooming and the vertical coordinate pixel value of the lower left vertex of visual area in the webpage (i.e., the foregoing y2) can be delivered into the visual area moving method, in order to move the webpage contents in a horizontal direction.

At Step S417, subsequently, invoking the original webpage render processor object for processing.

Figure 10:
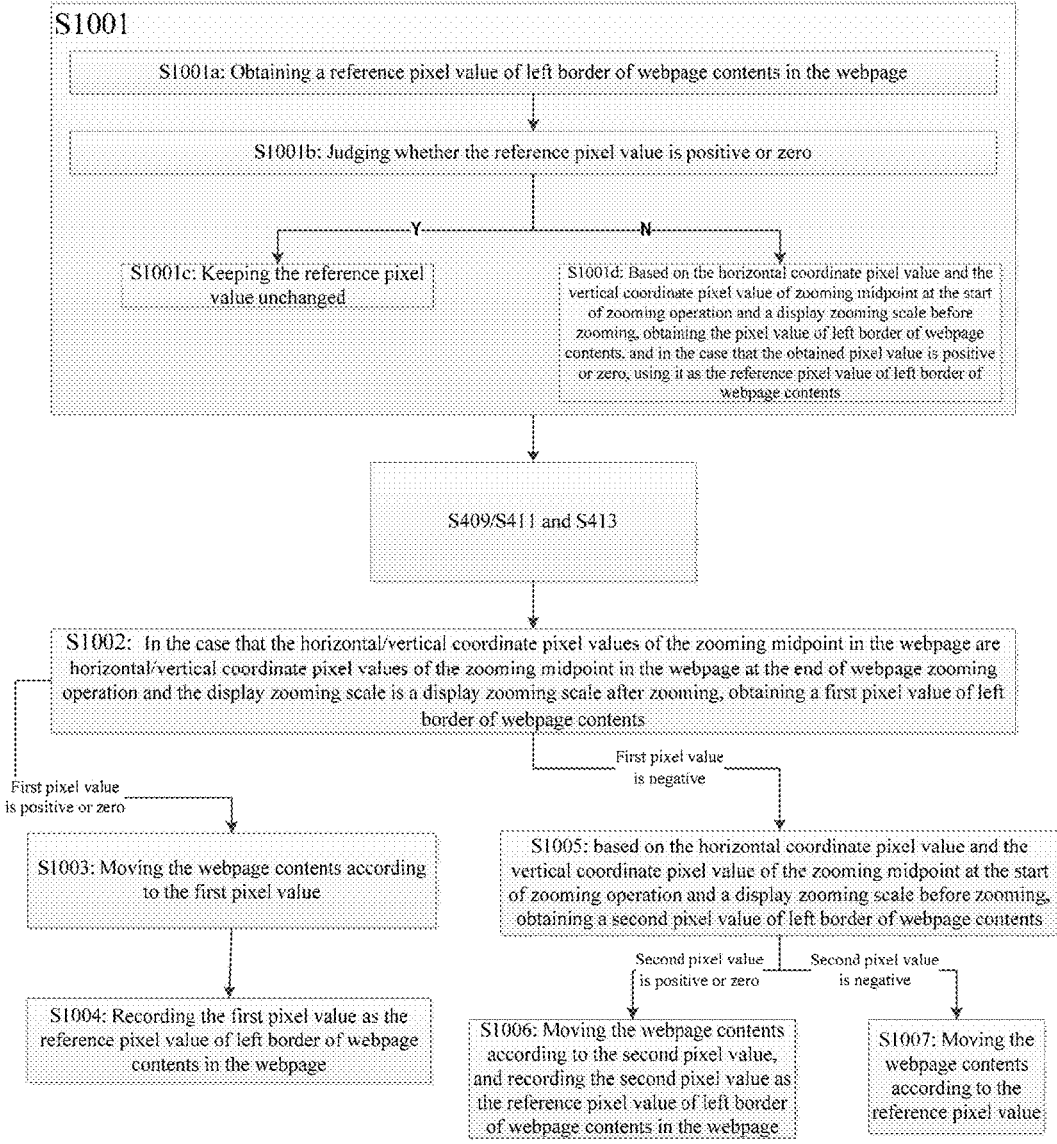
FIG. 10 is a flow chart schematically illustrating optional steps of a method for aligning after zooming according to an embodiment of the disclosure.

FIG. 10 schematically illustrates a flow chart including optional steps according to an embodiment of the disclosure. As shown in FIG. 10, optionally, according to the embodiment of the disclosure, Step S415 of obtaining the pixel value of left border of webpage contents, as described above, may include Step S1001d, Step S1002 and Step S1005, i.e., obtaining a reference pixel value, a first pixel value and a second pixel value of left border of webpage contents. Step S417 of moving the webpage contents according to the pixel value of left border of webpage contents, as described above, may include Step S1003, Step S1006 or Step S1007, i.e., moving the webpage contents according to the first pixel value, the second pixel value or the reference pixel value of left border of webpage contents. The foregoing steps and other optional steps according to the embodiment of the disclosure will be described in detail in connection with FIG. 10. As shown in FIG. 10, in addition to S1001*d*, S1002, S1005, S1003, S1006 and S1007, the method may further include optional Step S1001*a*, S1001*b*, S1001*c* and S1004.

As shown in FIG. 10, optionally, according to the embodiment of the disclosure, where, at Step S405, an operation of touching the electronic apparatus as an operation of releasing n−1 touch points in n touch points is detected, prior to Step S409 or Step S411 of setting the webpage text zooming scale to be the display zooming scale of the webpage display control, this method may further include Step S1001. First of all, at the first Sub-Step S1001*a* of Step S1001, obtaining a reference pixel value of left border of webpage contents in the webpage; next, at Sub-Step S1001*b*, judging whether the reference pixel value is positive or zero. If it is positive or zero, Sub-Step S1001*c* may be executed. The reference pixel value is kept unchanged. That is, if the reference pixel value is positive or zero, it may be proved that the reference pixel value of left border of webpage contents has been successfully obtained. According to the embodiment of the disclosure, a defaults value of the reference pixel value of left border of webpage contents in the webpage is a negative predefined value, for example, "−1". If the obtained reference pixel value is negative, then it may be proved that the pixel value of left border of webpage contents is not successfully obtained.

If the reference pixel value is negative, then Sub-Step S1001*d* is executed, which includes: based on the horizontal coordinate pixel value and the vertical coordinate pixel value of zooming midpoint at the start of zooming operation (for example, (x0, y0) as shown in FIG. 9) and a display zooming scale before zooming, obtaining the pixel value of left border of webpage contents, and in the case that the obtained pixel value is positive or zero, using it as the reference pixel value of left border of webpage contents. According to the embodiment of the disclosure, it is possible to use the operations at various sub-steps of Step S415, as described above, to obtain the horizontal coordinate pixel value and the vertical coordinate pixel value of the zooming midpoint at the start of zooming operation and the display zooming scale before zooming, in order to obtain the reference pixel value of left border of webpage contents. That is, at Sub-Step S1001*d*, as parameters, the horizontal coordinate pixel value and the vertical coordinate pixel value of the zooming midpoint at the start of zooming operation and the display zooming scale before zooming can be delivered into the webpage content left border pixel value obtaining method, in order to obtain the pixel value of left border of webpage contents. According to the embodiment of the disclosure, for Android system, the webpage content left border pixel value obtaining method could be the foregoing getBlockLeftEdge method or nativeGetBlockLeftEdge method.

As shown in FIG. 10, according to the embodiment of the disclosure, following Step S413, Step S1002 is executed, which includes: in the case that the horizontal/vertical coordinate pixel values of the zooming midpoint in the webpage are horizontal/vertical coordinate pixel values of the zooming midpoint in the webpage at the end of webpage zooming operation and the display zooming scale is a display zooming scale after zooming, obtaining the first pixel value of left border of webpage contents. According to the embodiment of the disclosure, it is possible to use the operations at various sub-steps of Step S415, as described above, to obtain the horizontal coordinate pixel value and the vertical coordinate pixel value of the zooming midpoint at the end of webpage zooming operation and the display zooming scale after zooming, in order to obtain the first pixel value of left border of webpage contents.

As shown in FIG. 10, optionally, according to the embodiment of the disclosure, following Step S1002, Step S1003 and S1004, or Step S1005 and S1006 (or S1007) may be executed. In the case that the first pixel value of left border of webpage contents is positive or zero, then Step S1003 may be executed, which includes: moving the webpage contents according to the first pixel value. Then, at Step S1004, recording the first pixel value as the reference pixel value of left border of webpage contents in the webpage. According to the embodiment of the disclosure, at Step S1004, as parameters, the first pixel value of left border of webpage contents, the display zooming scale after zooming and the vertical coordinate pixel value of the lower left vertex of visual area in the webpage (i.e., the foregoing y2) can be delivered into the visual area moving method, in order to move the webpage contents in a horizontal direction. That is, the position of the visual area is adjusted only in a horizontal direction, while it is kept unchanged in a vertical direction. For Android system, the visual area moving method could be a scrollTo method or a pinScrollTo method.

In the case that the first pixel value is negative, then Step S1005 is executed, which includes: based on the horizontal coordinate pixel value and the vertical coordinate pixel value of the zooming midpoint at the start of zooming operation (for example, (x0, y0) as shown in FIG. 9) and a display zooming scale before zooming, obtaining the second pixel value of left border of webpage contents. According to the embodiment of the disclosure, it is possible to use the operations at various sub-steps of Step S415, as described above, to obtain the horizontal coordinate pixel value and the vertical coordinate pixel value of the zooming midpoint at the start of zooming operation and the display zooming scale before zooming, in order to obtain the second pixel value of left border of webpage contents.

Then, in the case that the second pixel value of left border of webpage contents is positive or zero, Step S1006 is executed, which includes: moving the webpage contents according to the second pixel value, and recording the second pixel value as the reference pixel value of left border of webpage contents in the webpage. According to the embodiment of the disclosure, at Step S1005 as described above, as parameters, the horizontal coordinate pixel value and the vertical coordinate pixel value of the zooming midpoint at the start of zooming operation and the display zooming scale before zooming can be delivered into the webpage content left border pixel value obtaining method, in order to obtain the second pixel value of left border of webpage contents. For Android system, the webpage content left border pixel value obtaining method could be the foregoing getBlockLeftEdge method or nativeGetBlockLeftEdge method. At Step S1006 as described above, as parameters, the second pixel value, the display zooming scale after zooming and the vertical coordinate pixel value of the lower left vertex of visual area in the webpage (i.e., the foregoing y2) can be delivered into the visual area moving method, in order to move the webpage contents in a horizontal direction. That is, the position of the visual area is adjusted only in a horizontal direction, while it is kept unchanged in a vertical direction. For Android system, the visual area moving method could be the foregoing scrollTo method or pinScrollTo method.

When the second pixel value is negative, then Step S1007 is executed, which includes: moving the webpage contents according to the reference pixel value. Herein, as parameters, the reference pixel value, the display zooming scale after zooming and the vertical coordinate pixel value of the lower left vertex of visual area in the webpage (i.e., the foregoing y2) can be delivered into the visual area moving method, in order to move the webpage contents in a horizontal direction. Also, the position of the visual area is adjusted only in a horizontal direction, while it is kept unchanged in a vertical direction. The visual area moving method could be the foregoing scrollTo method or pinScrollTo method.

According to the embodiment of the disclosure, where the optional Step S1001 is executed, it is possible to obtain the reference pixel value of left border of webpage contents therefrom. Subsequently, in the case that first pixel value of left border of webpage contents is positive or zero, at Step S1004, the first pixel value can be recorded as the reference pixel value of left border of webpage contents in the webpage instead of the reference pixel value obtained at Step S1001; and in the case that the first pixel value is negative, if the second pixel value of left border of webpage contents is positive or zero, then at Step S1006, the second pixel value can be recorded as the reference pixel value of left border of webpage contents in the webpage instead of the reference pixel value obtained at Step S1001. However, if none of above conditions is satisfied, i.e., the first pixel value is negative and the second pixel value is also negative, then the reference pixel value obtained at Step S1001 could be used as the reference pixel value of left border of webpage contents.

Optionally, according to the embodiment of the disclosure, in the case that the first pixel value is negative, prior to Step S1005, it is also necessary to judge whether the display zooming scale at the end of zooming is more than the display zooming scale before zooming and judge whether the display zooming scale before zooming is more than zero. Only when both judging results are "YES", subsequent Step S1005 and further steps will be executed. Assuming that the screen width is kept unchanged, as soon as zooming is performed on the webpage, the webpage width will be changed and the display zooming scale of webpage display control will be changed accordingly.

Figure 12:
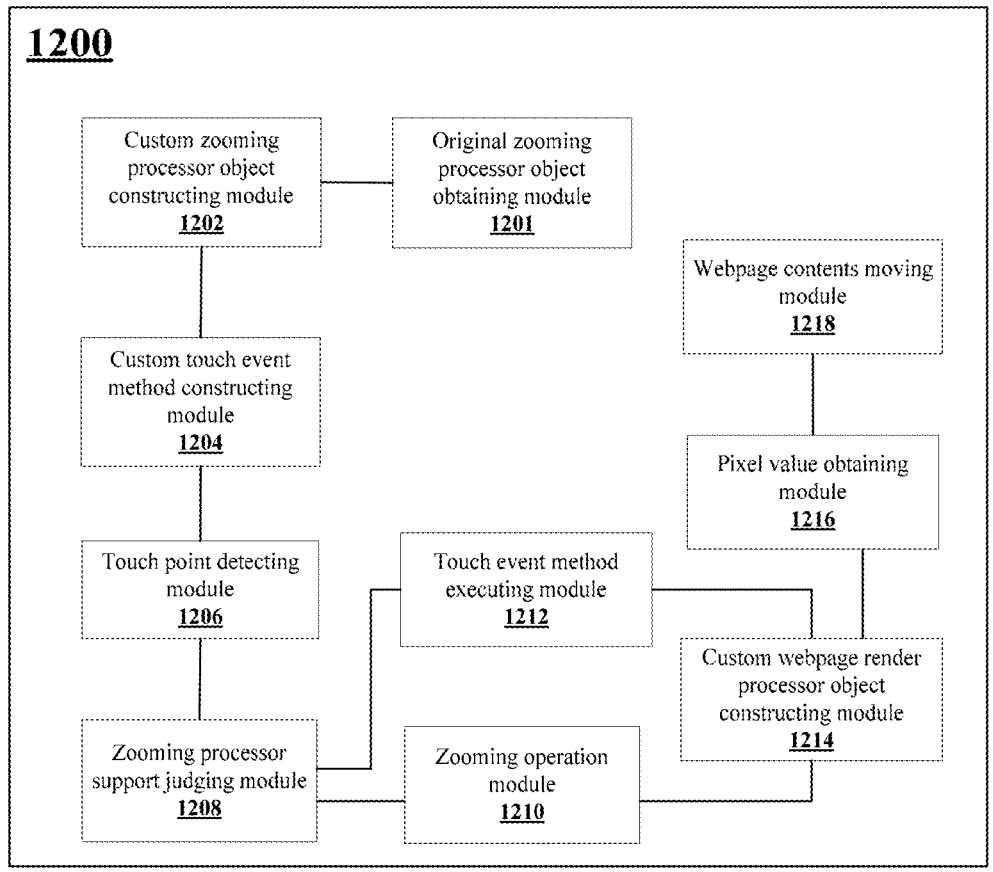
FIG. 12 is a block diagram schematically illustrating a device for webpage zooming on an electronic apparatus according to an embodiment of the disclosure.

After above steps in the method 400 for webpage zooming and aligning on the electronic apparatus according to the embodiment of the disclosure are executed, it may be possible to realize an effect of aligning along the left border of screen after webpage zooming. As shown in FIG. 12, it schematically illustrates a diagram of an aligned webpage after webpage zooming on an electronic apparatus.

The disclosure provides a method for webpage zooming and aligning on an electronic apparatus. According to the embodiment of the disclosure, it is possible to construct a custom zooming processor object and a custom touch event method, to detect an operation of touching an electronic apparatus as an operation of releasing n−1 touch points in n touch points, to judge whether the zooming processor object is supported by an operating system of the electronic apparatus, to set a webpage text zooming scale to be a display zooming scale of webpage display control in a zooming ending method and execute the zooming ending method of an original zooming processor object if it is supported, or to set a webpage text zooming scale to be a display zooming scale of webpage display control, reflectively set and enable a zooming scale method from a zooming manager object for invoking and execute a touch event method of an inherited webpage display control if it is not supported. As such, functions of re-composing after webpage zooming so that full screen is overspread with contents can be realized while the kernel component (for example, WebKit component in Android system) of browser or other webpage display program are not amended, thereby solving a problem that a portion of contents could not be displayed due to zooming-in. Furthermore, for an electronic apparatus having an operating system which does not support the zooming processor object, the embodiment of the disclosure is also able to complete the function of re-composing after zooming, thereby realizing a support for almost all the electronic apparatuses. Meanwhile, according to the embodiment of the disclosure, it is possible to take full advantage of new features from an operating system having new version. For example, by taking advantage of a hardware acceleration function in Android 4.0 or higher versions, a zooming speed can be significantly improved and characteristics such as a superior webpage viewing feature in Android 4.0 or higher versions can be used. In addition, since there is no need to modify the kernel component of browser or other webpage display programs, memory space of the electronic apparatus can be saved while a risk of modifying the kernel component of browser can be eliminated. In addition, according to the embodiment of the disclosure, it is possible to construct a custom webpage render processor object, to obtain a pixel value of left border of webpage contents in the case that the webpage zooming is performed, and to move the webpage contents according to the pixel value of left border of webpage contents, whereby the webpage contents can be automatically moved after webpage zooming, such that the left border of webpage contents is aligned with the left border of electronic apparatus screen to allow the screen to be overspread with the webpage contents. Therefore, it is possible to make a use of a display space of screen to reach a desirable display effect. According to the disclosure, automatic alignment after webpage zooming can be realized without manual intervention while avoiding problems that manual adjustment is so inaccurate that a desirable display effect could not be realized. Moreover, by making a use of the operations of the pixel value, the second pixel value and the reference pixel value of left border of webpage contents, it is possible to furthest overcome problems that a webpage content correlative area could not be found since the pixel value of left border of webpage contents of some operating systems is less than zero, thereby realizing a support for almost all the operating systems.

Correspondingly to the foresaid method 400, the disclosure also provides a device 1200 for webpage zooming and aligning on an electronic apparatus. FIG. 12 schematically illustrates a block diagram of a device 1200 for webpage zooming and aligning on an electronic apparatus according to an embodiment of the disclosure.

With reference to FIG. 12, the device 1200 for webpage zooming and aligning on an electronic apparatus substantially includes: a custom zooming processor object constructing module 1202, a custom touch event method constructing module 1204, a touch point detecting module 1206, a zooming processor support judging module 1208, a zooming operation module 1210 and a touch event method executing module 1212.

According to the embodiment of the disclosure, the custom zooming processor object constructing module 1202 is configured to generate an object of inheritance zooming processor class into which an original zooming processor object is delivered, in order to construct a custom zooming processor object and replace the original zooming processor object with the custom zooming processor object; the custom touch event method constructing module 1204 is configured to inherit a webpage display control to construct a custom touch event method; the touch point detecting module 1206 is configured to detect an operation of touching an electronic apparatus as an operation of releasing n−1 touch points in n touch points, wherein n is an integer which is more than or equal to 2; the zooming processor support judging module 1208 is configured to judge whether the zooming processor object is supported by an operating system of the electronic apparatus; the zooming operation module 1210 is configured to, if it is supported, the zooming processor object performs operation, including a zooming starting method, a zooming process method and a zooming ending method, wherein a webpage text zooming scale is set to be a display zooming scale of the webpage display control in the zooming ending method, and executed the zooming ending method of the original zooming processor object; the touch event method executing module 1212 is configured to, if it is not supported, set the webpage text zooming scale to be the display zooming scale of the webpage display control, reflectively set and enable a zooming scale method from a zooming manager object for invoking, and execute a touch event method of the inherited webpage display control.

First, the custom zooming processor object constructing module 1202 may generate an object of inheritance zooming processor class into which an original zooming processor object is delivered, in order to construct a custom zooming processor object and replace the original zooming processor object with the custom zooming processor object.

Optionally, according to the embodiment of the disclosure, the device 1200 may further include an original zooming processor object obtaining module 1201, which is configured to obtain the original zooming processor object.

According to the embodiment of the disclosure, in the case that the operating system of electronic apparatus is Android 2.3.x (for example, Android 2.3.7) or lower versions, the original zooming processor object obtaining module 1201 may reflect and obtain a zooming detector object from the webpage display control, and may reflect and obtain an original zooming processor object from the zooming detector object. According to the embodiment of the disclosure, the webpage display control may be a WebView control of Android system, for example. The scope of the disclosure is not limited thereto, and the webpage display control could be any controls capable of realizing a webpage display function, such as UIWebView control of iOS system. Optionally, for Android system, the zooming processor object could be an mListener object, and the zooming detector object could be an mScaleDetector object that belongs to a ScaleGestureDetector class. Of course, these examples are provided merely for illustrating the principle of the disclosure and the scope of the disclosure is not limited thereto.

According to the embodiment of the disclosure, the zooming processor object is a module invoked when the zooming operation is performed for a certain control. The zooming processor object in Android system (mListener object) is an object of zooming processor class (OnScaleGestureListener class) which includes the zooming starting method, the zooming process method and the zooming ending method. For the mListener object, they are an onScaleBegin method, an onScale method and an onScaleEnd method, respectively. Taking a scenario in which a user makes zooming with two fingers on the touch screen of electronic apparatus as an example, when the user is ready for zooming with two fingers, i.e., the user puts down two fingers and starts to drag, the zooming starting method of the zooming processor object can be invoked; when the user is making zooming, the zooming process method of the zooming processor object can be invoked; when the user looses at least one of two fingers, it may suggest the zooming is completed and the zooming ending method of zooming processor object can be invoked. Each of zooming supportable controls, including WebView control, can realize its own zooming processor object.

In addition, reflection operations can be performed by using reflex mechanism provided in Java language and .Net language. Attribute of methods and objects can be temporarily changed from private attribute to public attribute for direct use and modification. It could be appreciated by those skilled in the art, other programming languages also can be used to temporarily change the attribute of methods and objects from private attribute to public attribute in a similar manner for reaching the purpose of reflection operation.

For Android system, the original zooming processor object obtaining module 1201 may obtain a version number of Android system by obtaining a Build.VERSION.SDK_INT object.

According to the embodiment of the disclosure, in the case that the operating system of electronic apparatus is Android 4.0 or higher versions, the original zooming processor object obtaining module 1201 may reflect and obtain a zooming manager object from the webpage display control, may reflect and obtain a zooming detector object from the zooming manager object, and may reflect and obtain an original zooming processor object from the zooming detector object. In the contexts, for Android system, the zooming manager object could be an mZoomManager object which can be directly or indirectly invoked by the WebView control. As such, the zooming operations can be separated from originally complex WebView control as a relatively independent module which can be used by the WebView control (or even other controls). In the contexts, for Android 2.3.x or lower versions, Java class is a WebView control class, which is a WebView class; while, for Android 3.0 and later versions, the object is an object of Java class directly used by the WebView control, which is an object of ZoomManager class.

According to the embodiment of the disclosure, the custom zooming processor object constructing module 1202 may generate an object of inheritance zooming processor class into which an original zooming processor object is delivered, in order to construct a custom zooming processor object and replace the original zooming processor object with the custom zooming processor object.

According to the embodiment of the disclosure, the custom zooming processor object constructing module 1202 may generate an object which is allowed to inherit the zooming processor class. In Android system, the zooming processor class is an OnScaleGestureListener class. As such, the object can realize its own zooming starting method, zooming process method and zooming ending method. Then, it is necessary for the custom zooming processor object constructing module 1202 to deliver the original zooming processor object into this object to construct the custom zooming processor object. As such, after use of the custom zooming processor object, it is also possible to invoke the original zooming processor object of system. After replacing the original zooming processor object with the custom zooming processor object, the custom zooming processor object constructing module 1202 may set a value of variable "whether to support zooming processor object" to be "true".

Subsequently, the custom touch event method constructing module 1204 may inherit the webpage display control to construct a custom touch event method. According to the embodiment of the disclosure, the touch event method, for example, could be an onTouchEvent method and/or a dispatchTouchEvent method in Android system. For any touch operations on a certain control by the user, Android system may trigger a touch processing event of this control. The onTouchEvent method and the dispatchTouchEvent method may have a parameter which is used to describe user's current touch conditions. In Android system, it is a MotionEvent object that is used, for example, to describe the number of user's current touch points, corresponding coordinates and touch conditions such as "moving", "pressing", "releasing", etc.

According to the embodiment of the disclosure, the custom touch event method constructing module 1204 may generate an object which is allowed to inherit the webpage display control, in order to construct its own custom touch event method, such as onTouchEvent method and dispatchTouchEvent method.

Next, the touch point detecting module 1206 may detect an operation of touching an electronic apparatus as an operation of releasing n−1 touch points in n touch points, wherein n is an integer which is more than or equal to 2.

In the case of n=2 for example, i.e., assuming that the user touches the touch screen of the electronic apparatus with two fingers, when one of fingers is released, a touch processing event method may be triggered.

According to the embodiment of the disclosure, for Android system, the touch point detecting module 1206 may use ACTION_POINTER_UP object or ACTION_POINTER_n_UP object to detect whether n−1 touch points in n touch points are released to trigger the touch event method.

When the touch point detecting module 1206 detects the operation of touching the electronic apparatus as the operation of releasing n−1 touch points in n touch points, the zooming processor support judging module 1208 may judge whether an operating system of the electronic apparatus supports the zooming processor object.

For Android system, the zooming processor object could be an mListener object which is a module invoked when the zooming operation is performed for a certain control. The mListener object in Android system is an object of the zooming processor class (OnScaleGestureListener class), which includes a zooming starting method, a zooming process method and a zooming ending method. For the mListener object, they are an onScaleBegin method, an onScale method and an onScaleEnd method, respectively. Taking a scenario in which a user makes zooming with two fingers on the touch screen of electronic apparatus as an example, when the user is ready for zooming with two fingers, i.e., the user puts down two fingers and starts to drag, the zooming starting method of the zooming processor object can be invoked; when the user is making zooming, the zooming process method of the zooming processor object can be invoked; when the user looses two fingers, it may suggest the zooming is completed and the zooming ending method of zooming processor object can be invoked. Each of zooming supportable controls, including WebView control, can realize its own zooming processor object.

When the zooming processor support judging module 1208 judges that the operating system of the electronic apparatus supports the zooming processor object, the zooming operation module 1210 may operate by the zooming processor object, including a zooming starting method, a zooming process method and a zooming ending method, wherein a webpage text zooming scale is set to be a display zooming scale of the webpage display control in the zooming ending method, and execute the zooming ending method of the original zooming processor object.

According to the embodiment of the disclosure, in the course that the zooming operation module 1210 sets the webpage text zooming scale to be the display zooming scale of the webpage display control, in the case that the operating system of electronic apparatus is Android 2.3.x or lower versions, a text zooming scale object can be reflected from the webpage display control and the value of the display zooming scale of the webpage display control could be assigned to the text zooming scale object; in the case that the operating system of electronic apparatus is Android 4.0 or higher versions, a text zooming scale object can be reflected from the zooming manager object and the value of the display zooming scale of the webpage display control is assigned to the text zooming scale object.

According to the embodiment of the disclosure, in Android system, the text zooming scale object could be an mTextWrapScale object. The assignment of the display zooming scale of the webpage display control to the text zooming scale object means the value of the text zooming scale of text zooming scale object is equalized to the value of the display zooming scale of the webpage display control. In the contexts, the text zooming scale indicates "webpage width"/"text width", the display zooming scale indicates "webpage width"/"screen width". When the value of the text zooming scale is equal to the value of the display zooming scale, the text width is equal to the webpage width accordingly such that the texts are displayed in full screen. For example, if the text zooming scale is 2 while the display zooming scale of the WebView control is 1, it may be indicated a ratio of texts to screen is 1/2; if the display scale of the WebView control is 1 while the text zooming scale is 1, it may be indicated a ratio of texts to screen is 1/1, which means a full-screen. In addition, even if the user slides the screen by touch operations in the use to move the text part out of the screen (for example, slide to rightmost until the texts are all moved out of screen), since the text zooming scale is unchanged, when the user slides the texts back by touch operations, the full screen is certain to be overspread with texts once the left border of texts is aligned with the left border of electronic apparatus screen.

According to the embodiment of the disclosure, the zooming operation module 1210 may prohibit simultaneous operation of zooming and dragging in the zooming starting method and execute the zooming starting method of the original zooming processor object In the contexts, in the case that the operating system of electronic apparatus is Android 2.3.x or higher versions, an mAllowPanAndScale object can be obtained from the zooming manager object by reflecting and a value of the mAllowPanAndScale object can be set to be "false". The mAllowPanAndScale object is used to indicate whether to allow for changing the zooming midpoint. For example, when two fingers drag in the course of zooming with two fingers, the entire contents can be moved; its value which is set to be "false" means to disable this function, so as to ensure no rotation in the course of zooming.

According to the embodiment of the disclosure, the zooming operation module 1210 may execute the zooming process method of the original zooming processor object in the zooming process method.

According to the embodiment of the disclosure, the zooming operation module 1210 may judge whether the webpage supports zooming function in the zooming ending method. Reference can be made to FIG. 5 to understand optional operations of various modules of the device 1210 according to the embodiment of the disclosure.

Optionally, the foresaid judging operation of the zooming operation module 1210 can be realized in a following manner: obtaining a variable "whether to support zooming" in a WebView control setting module (WebSettings object in Android system), which has a Boolean value wherein "true" indicates "support for zooming function" and "false" indicates "no support for zooming function" to close the judging operation; to complete obtaining operation, reflecting a "minimum zooming scale of current webpage" object and a "maximum zooming scale of current webpage" object from the zooming manager object, which are an mMinZoomScale object and an mMaxZoomScale object in Android system, respectively. Usually, a part of source codes (invisible to users) of the webpage may be used to advise of a zooming scale range of the webpage, the value of which is not public usually and thus is necessarily obtained by reflection; then, it is possible to compare whether a value of the "minimum zooming scale of current webpage" object is equal to a value of the "maximum zooming scale of current webpage" object, if equal, then directly return "false" which indicates the webpage does not support the zooming function, and if not equal, then return "true", which indicates the value of the variable "whether to support zooming function" is "true" and the webpage supports the zooming function.

In the case that the webpage does not support the zooming function, the zooming operation module 1210 may directly execute the zooming ending method of the original zooming processor object.

In the case that the webpage supports the zooming function, the zooming operation module 1210 may judge a version of Android system.

In the case that Android system is 4.0 or higher versions, a "whether there is an animation when zooming" object (in Android system, an mPinchToZoomAnimating object) in the zooming manager object can be obtained through the reflex mechanism provided by Java. This object has a Boolean value, wherein if its value is "false", then the zooming operation module 1210 may directly execute the zooming ending method of the original zooming processor object; if its value is "true", then the zooming operation module 1210 may execute the operation of setting the webpage text zooming scale to be the display zooming scale of the webpage display control as described above, and execute the zooming ending method of the original zooming processor object.

In the case that Android system is 2.3.x or lower versions, a "whether to preview zooming effect" object can be reflected from the zooming manager object of the zooming operation module 1210 to complete an obtaining operation. In Android system, the object could be an mPreviewZoomOnly object, wherein if a valve of the object is "true", then the zooming operation module 1210 may execute the operation of setting the webpage text zooming scale to be the display zooming scale of the webpage display control as described above and execute the zooming ending method of the original zooming processor object; if a valve of the object is "false", then the zooming operation module 1210 may directly execute the zooming ending method of the original zooming processor object.

When the zooming processor support judging module 1208 judges that the operating system of the electronic apparatus does not support zooming processor object, the touch event method executing module 1212 may set the webpage text zooming scale to be the display zooming scale of the webpage display control, reflectively set and enable a zooming scale method from a zooming manager object for invoking, and execute a touch event method of the inherited webpage display control.

Similarly, according to the embodiment of the disclosure, in the case that the operating system of electronic apparatus is Android 2.3.x or lower versions, the touch event method executing module 1212 may reflect a text zooming scale object from the webpage display control, and assign a value of the display zooming scale of the webpage display control to the text zooming scale object.

In addition, for Android system, the touch event method executing module 1212 may obtain a version number of Android system by obtaining a Build.VERSION.SDK_INT object.

In the case that the operating system of electronic apparatus is Android 4.0 or higher versions, the touch event method executing module 1212 may reflect a text zooming scale object from the zooming manager object, and assign a value of the display zooming scale of the webpage display control to the text zooming scale object.

Subsequently, the touch event method executing module 1212 may reflectively set and enable a zooming scale method from the zooming manager object for invoking, and execute the touch event method of the inherited webpage display control. In addition, where the touch point detecting module 1206 fails to detect an operation of touching the electronic apparatus as an operation of releasing n−1 touch points in n touch points, the touch event method executing module 1212 may directly execute the touch event method of the inherited webpage display control.

According to the embodiment of the disclosure, for Android system, the setting and enabling zooming scale method could be a setZoomScale method or a setNewZoomScale method. Parameters delivered when invoked by the touch event method executing module 1212 may include: the webpage text zooming scale which is set to be the display zooming scale of the webpage display control, an allowance for text composition (set to be "true") and an allowance for compulsive text composition (set to be "true").

After invoking the setting and enabling zooming scale method, the touch event method executing module 1212 may execute the touch event method of the inherited webpage display control, i.e., original touch event method, and for Android system, that is to invoke the onTouchEvent method and the dispatchTouchEvent method of its parent class. As such, functions of re-composing after webpage zooming so that full screen is overspread with contents can be realized.

Optionally, according to the embodiment of the disclosure, before the zooming operation module 1210 or the touch event method executing module 1212 sets the webpage text zooming scale to be the display zooming scale of the webpage display control, it is also possible to set the value of whether to enable widescreen viewing object to be "false". For Android system, the whether to enable widescreen viewing object could be a setUseWideViewPort object, a value of which is stored in a WebView control setting module (in Android system, a WebSettings object). By this operation, the user can be prevented from moving the webpage by touching the screen of electronic apparatus after the display scale zooms in.

Optionally, according to the embodiment of the disclosure, before the zooming operation module 1210 executes the zooming ending method of the original zooming processor object or the touch event method executing module 1212 executes touch event method of the inherited webpage display control, it is possible to set the value of the whether to enable widescreen viewing object to be "true". By this operation, the function of moving webpage by touch operations can be restored after texts are re-composed.

Additionally and optionally, before the touch point detecting module 1206 executes the detecting operations, the touch point detecting module 1206 may also judge whether the number of current touch points is more than 1 and judge whether the webpage supports the zooming function. In the course of above two judging operations, if either one of the judgment results is NO, no further processing will occur, and the touch event method executing module 1212 may directly execute the touch event method of the inherited webpage display control.

Optionally, the operation of judging whether the webpage supports the zooming function by the touch point detecting module 1206 may be realized in a following manner: obtaining a variable "whether to support zooming" in a WebView control setting module (WebSettings object in Android system), which has a Boolean value wherein "true" indicates "support for zooming function" and "false" indicates "no support for zooming function" to close the judgment; to complete obtaining operation, reflecting a "minimum zooming scale of current webpage" object and a "maximum zooming scale of current webpage" object from the zooming manager object, which are an mMinZoomScale object and an mMaxZoomScale object in Android system, respectively. Usually, a part of source codes (invisible to users) of the webpage may be used to advise of a zooming scale range of the webpage, the value of which is not public usually and thus is necessarily obtained by reflection; then, it is possible to compare whether a value of the "minimum zooming scale of current webpage" object is equal to a value of the "maximum zooming scale of current webpage" object, if equal, then directly return "false" which indicates the webpage does not support the zooming function, and if not equal, then return "true", which indicates the value of the variable "whether to support zooming function" is "true" and the webpage supports the zooming function. As shown in FIG. 12, optionally, the device 1200 according to the embodiment of the disclosure may further include a custom webpage render processor object constructing module 1214, a pixel value obtaining module 1216 and a webpage contents moving module 1218, which are used to realize an aligning function after zooming.

According to the embodiment of the disclosure, the custom webpage render processor object constructing module 1214 may generate an object of inherited event processor class into which an original webpage render processor object of the webpage display control is delivered, in order to construct a custom webpage render processor object and replace the original webpage render processor object of the webpage display control with the custom webpage render processor object.

As shown in FIG. 12, optionally, the device 1200 according to the embodiment of the disclosure may further include an original webpage render processor object obtaining module, which may obtain the original webpage render processor object of the webpage display control.

According to the embodiment of the disclosure, for Android system, the webpage render processor object could be an mPrivateHandler object. However, the scope of the disclosure is not limited thereto and it may also be for example WindowMessages in Windows system or similar modules in other systems. For Android system, the webpage render processor object is a processing module for sending messages from browser kernel component WebKit to WebView. In Android system, it is realized in a Handler manner and plays a role in receiving a message event. Since WebView is simply used to display and receive a touch event while substantial operations are all completed in the WebKit component, when the WebKit component finishes processing, it may sent one or more piece of notification to the WebView control to realize instant refreshing and processing. The webpage render processor object has only one method, which is a message receiving method. For Android system, it is a handleMessage method which is invoked by the system and an occurrence condition of which would be: WebView receives a message from WebKit. According to the embodiment of the disclosure, the original webpage render processor object obtaining module may reflect an original webpage render processor object from the webpage display control to obtain the original webpage render processor object.

Next, the custom webpage render processor object constructing module 1214 may generate an object of inherited event processor class into which the original webpage render processor object of the webpage display control is delivered, in order to construct a custom webpage render processor object and replace the original webpage render processor object of the webpage display control with the custom webpage render processor object.

According to the embodiment of the disclosure, the custom webpage render processor object constructing module 1214 may generate an object which is allowed to inherit the object of event processor class. For example, for Android system, the event processor class is a Handler class. As such, the object can realize its own message receiving method (for Android system, a handleMessage method). Then, the custom webpage render processor object constructing module 1214 may necessarily deliver the original webpage render processor object into this object to construct a custom webpage render processor object. As such, after use of the custom webpage render processor object, it is also possible to invoke the original webpage render processor object of the system. In the end, the custom webpage render processor object constructing module 1214 may replace the original webpage render processor object of the webpage display control with the custom webpage render processor object.

Subsequently, the pixel value obtaining module 1216 may obtain pixel values of left border of webpage contents. The webpage contents moving module 1218 may move the webpage contents according to the pixel values of left border of webpage contents and invoke the original webpage render processor object for processing.

According to the embodiment of the disclosure, a horizontal coordinate pixel value of the zooming midpoint in the webpage and its vertical coordinate pixel value in the webpage could be a horizontal coordinate pixel value of the zooming midpoint in the webpage and its vertical coordinate pixel value in the webpage at the end of webpage zooming operation. The display zooming scale could be a display zooming scale after zooming. In the contexts, the pixel value obtaining module may deliver, as parameters, the horizontal coordinate pixel value of the zooming midpoint in the webpage and its vertical coordinate pixel value in the webpage at the end of webpage zooming operation, and the display zooming scale after zooming, into the webpage content left border pixel value obtaining method to obtain a first pixel value of the left border of webpage contents. According to the embodiment of the disclosure, the pixel value obtaining module 1216 may obtain the first pixel value after a webpage refreshing message is received. According to the embodiment of the disclosure, it may be necessary for the pixel value obtaining module 1216 to whether the webpage refreshing message is received. In general, the WebView control may receive the webpage refreshing message each time the webpage is changed, whether the changes is from user's operation, animation of webpage or script of webpage as long as webpage contents are changed on the screen. Usually, every 2-3 seconds, or when the user operates in the webpage or the webpage itself is changed, the webpage refreshing message may be invoked 1-10 times. In Android system, the webpage refreshing message is numbered 105, named "NEW_PICTURE_MSG_ID", and it may have somewhat different numbers in other systems. According to the embodiment of the disclosure, after the webpage refreshing message is received and when a next webpage refreshing message is received, an aligning operation according to the disclosure is started to perform, and in Android system, that is to use a post method of Handler. This is because, if the aligning operation is performed each time the webpage refreshing message is received, efficiency of refreshing the webpage by previous webpage zooming operation may be influenced. Therefore, it is desirable to perform the aligning operation when a next webpage refreshing message is received (no more than 10 ms).

According to the embodiment of the disclosure, the process of obtaining the pixel value of left border of webpage contents by the pixel value obtaining module 1216 may include following operations. Reference may be made to FIG. 7 to understand the operations of the pixel value obtaining module 1216.

First, the pixel value obtaining module 1216 may reflect a zooming midpoint horizontal-coordinate pixel value method and a zooming midpoint vertical-coordinate pixel value method from the zooming manager object, in order to obtain horizontal/vertical coordinate pixel values of a view where the zooming midpoint is located.

According to the embodiment of the disclosure, for Android system, the zooming manager object could be an mZoomManager object which can be directly or indirectly invoked by the WebView control. As such, the zooming operations can be separated from originally complex WebView control as a relatively independent module which can be used by the WebView control (or even other controls). In the contexts, for Android 2.3.x or lower versions, Java class is a WebView control class, which is a WebView class; while, for Android 3.0 and later versions, the object is an object of Java class directly used by the WebView control, which is an object of ZoomManager class. For Android system, the zooming midpoint horizontal-coordinate pixel value method could be an mZoomCenterX method, and the zooming midpoint vertical-coordinate pixel value method could be an mZoomCenterY method.

FIG. 8 is a diagram schematically illustrating a relative position of a zooming midpoint in webpage and visual area according to an embodiment of the disclosure. The pixel value obtaining module 1216 may obtain the horizontal/vertical coordinate pixel values of the view where the zooming midpoint is located. As shown in FIG. 8, horizontal/vertical coordinate pixel values (x1, y1) of the zooming midpoint with respect to a lower left vertex O1 of display area can be obtained by the pixel value obtaining module 1216.

FIG. 9 is a diagram schematically illustrating the zooming midpoint at the start of zooming operation and at zooming operation ending according to an embodiment of the disclosure. As shown in FIG. 9, a location coordinate of the zooming midpoint at the start of zooming operation is (x0, y0), while a location coordinate of the zooming midpoint at zooming operation ending is (x1, y1). In the operations of the pixel value obtaining module 1216, the zooming midpoint could be a zooming midpoint at zooming operation ending, i.e., (x1, y1) in FIG. 9.

Next, the pixel value obtaining module 1216 may invoke a visual area horizontal-coordinate pixel value obtaining method and a visual area vertical-coordinate pixel value obtaining method of the webpage display control, to obtain horizontal/vertical coordinate pixel values of a lower left vertex of visual area in the webpage. According to the embodiment of the disclosure, the visual area horizontal-coordinate pixel value obtaining method could be a getScrollX method, and the visual area vertical-coordinate pixel value obtaining method could be a getScrollY method. As shown in FIG. 8, it is desirable for the pixel value obtaining module 1216 to obtain horizontal/vertical coordinate pixel values (x2, y2) of the lower left vertex O1 of display area with respect to a lower left vertex O2 of webpage.

Subsequently, the pixel value obtaining module 1216 may reflect a content horizontal-coordinate pixel value obtaining method and a content vertical-coordinate pixel value obtaining method from the webpage display control, add the horizontal/vertical coordinate pixel values of the view where the zooming midpoint is located to the horizontal/vertical coordinate pixel values of the lower left vertex of visual area in the webpage, respectively, and deliver them as parameter to the content horizontal-coordinate pixel value obtaining method and the content vertical-coordinate pixel value obtaining method, in order to obtain a horizontal coordinate pixel value of the zooming midpoint in the webpage and a vertical coordinate pixel value of the zooming midpoint in the webpage.

According to the embodiment of the disclosure, for Android system, the content horizontal-coordinate pixel value obtaining method could be a viewToContentX method, and the content vertical-coordinate pixel value obtaining method could be a viewToContentY method. The pixel value obtaining module 1216 may add up the horizontal/vertical coordinate pixel values of the view where the zooming midpoint is located and the horizontal/vertical coordinate pixel values of the lower left vertex of visual area in the webpage, to obtain the horizontal/vertical coordinate pixel values (x1+x2, y1+y2), i.e., horizontal/vertical coordinate pixel values of zooming midpoint with respect to the lower left vertex O2 of the webpage, which could be the horizontal coordinate pixel value of the zooming midpoint in the webpage and the vertical coordinate pixel value of the zooming midpoint in the webpage. By delivering (x1+x2, y1+y2) as a parameter into the content horizontal-coordinate pixel value obtaining method and the content vertical-coordinate pixel value obtaining method, the pixels of some margins and scroll bars can be removed to obtain a more accurate positional representation.

Subsequently, the pixel value obtaining module 1216 may invoke a display zooming scale obtaining method of the webpage display control to obtain a display zooming scale. According to the embodiment of the disclosure, for Android system, the display zooming scale obtaining method could be a getScale method. It is desirable for the pixel value obtaining module 1216 to obtain the display zooming scale at the end of zooming.

Next, the pixel value obtaining module 1216 may deliver the horizontal coordinate pixel value of the zooming midpoint in the webpage, the vertical coordinate pixel value of the zooming midpoint in the webpage, the display zooming scale, as parameters, into a webpage content left border pixel value obtaining method, in order to obtain pixel values of the left border of the webpage contents. For example, the pixel value obtaining module 1216 may deliver the horizontal coordinate pixel value of the zooming midpoint in the webpage, its vertical coordinate pixel value in webpage at the end of webpage zooming operation and the display zooming scale after zooming, as parameters, into the webpage content left border pixel value obtaining method, to obtain a first pixel value of left border of webpage contents. According to the embodiment of the disclosure, for Android system, the webpage content left border pixel value obtaining method could be a getBlockLeftEdge method or a nativeGetBlockLeftEdge method. For Android 4.1.x or higher versions, the getBlockLeftEdge method can be used, while for Android 4.1.x or lower versions, the nativeGet-BlockLeftEdge method can be used. For Android system, a version number of Android system can be obtained by obtaining a Build. VERSION.SDK_INT object.

The pixel value obtaining module 1216 may deliver, as parameters, the horizontal/vertical coordinate pixel values (x1+x2, y1+y2) and the display zooming scale after zooming into the getBlockLeftEdge method or the nativeGetBlock-LeftEdge method. In the case that a returned pixel value of left border of webpage contents is negative it may be indicated no pixel value of left border of webpage contents is obtained such that the aligning operation could not be executed. In this regard, it is possible to discard the pixel value. In the case that a returned pixel value of left border of webpage contents is positive or zero, it may be indicated a pixel value of left border of webpage contents has been obtained.

Next, the webpage contents moving module 1218 may move the webpage contents according to the pixel value of left border of webpage contents. According to the embodiment of the disclosure, as parameters, the stored pixel value of left border of webpage contents (for example, the foregoing first pixel value), the display zooming scale (for example, the foregoing display zooming scale after zooming) and the vertical coordinate pixel value of the lower left vertex of visual area in the webpage (i.e., the foregoing y2) can be delivered into a visual area moving method, in order to move the webpage contents in a horizontal direction. That is, the position of the visual area is adjusted only in a horizontal direction, while it is kept unchanged in a vertical direction. For Android system, the visual area moving method could be a scrollTo method or a pinScrollTo method.

According to the embodiment of the disclosure, the pixel value obtaining module 1216 may subtract a predefined pixel value from the stored pixel value of left border of webpage contents to obtain a revised pixel value of left border of webpage contents, and the webpage contents moving module 1218 may deliver, as parameters, the revised pixel value, the display zooming scale after zooming and the vertical coordinate pixel value of the lower left vertex of visual area in the webpage into the visual area moving method in order to move the webpage contents in a horizontal direction. The purpose of subtracting the predefined pixel value from the pixel value of left border of webpage contents is for ensuring a normal alignment. The predefined pixel value can be selected dependently on actual demand, for example, 5 pixels. That is, 5 pixels are subtracted from the stored pixel value of left border of webpage contents to obtain the revised pixel value of left border of webpage contents. According to the embodiment of the disclosure, when the revised pixel value is less than zero, the revised pixel value may be set to zero. Then, the webpage contents moving module 1218 may deliver, as parameters, the revised pixel value, the display zooming scale after zooming and the vertical coordinate pixel value of the lower left vertex of visual area in the webpage (i.e., the foregoing y2) into the visual area moving method, in order to move the webpage contents in a horizontal direction.

To reiterate, the zooming midpoint used in above operations could be a zooming midpoint at the zooming operation ending.

Next, the webpage contents moving module 1218 may invoke the original webpage render processor object for processing.

Hereinafter, optional operations according to the embodiment of the disclosure will be described. Reference can be made to FIG. 10 to understand the operations.

Optionally, according to the embodiment of the disclosure, where an operation of touching the electronic apparatus as an operation of releasing n−1 touch points in n touch points is detected by the touch point detecting module 1206, before the zooming operation module 1210 or the touch event method executing module 1212 sets the webpage text zooming scale to be the display zooming scale of the webpage display control, it is also possible to obtain a reference pixel value of left border of webpage contents in the webpage; next, the pixel value obtaining module 1216 may judge whether the reference pixel value is positive or zero. If it is positive or zero, then the reference pixel value will be kept unchanged. That is, if the reference pixel value is positive or zero, it may be proved that the pixel value obtaining module 1216 has successfully obtained the reference pixel value of left border of webpage contents. According to the embodiment of the disclosure, a defaults value of the reference pixel value of left border of webpage contents in the webpage is a negative predefined value, for example, "−1". If the obtained reference pixel value is negative, then it may be proved that the pixel value of left border of webpage contents is not successfully obtained.

If the reference pixel value is negative, then the pixel value obtaining module 1216 may, based on the horizontal coordinate pixel value and the vertical coordinate pixel value of the zooming midpoint at the start of zooming operation (for example, (x0, y0) as shown in FIG. 9) and the display zooming scale before zooming, obtain the pixel value of left border of webpage contents, and in the case that the obtained pixel value is positive or zero, use it as a reference pixel value of left border of webpage contents. In the contexts, according to the embodiment of the disclosure, the pixel value obtaining module 1216 may obtain the horizontal coordinate pixel value and the vertical coordinate pixel value of the zooming midpoint at the start of zooming operation and the display zooming scale before zooming in the same manner as the operations as described above, and obtain the reference pixel value in the same manner as the operations as described above. That is, the pixel value obtaining module 1216 may deliver, as parameters, the horizontal coordinate pixel value and the vertical coordinate pixel value of the zooming midpoint at the start of zooming operation and the display zooming scale before zooming into the webpage content left border pixel value obtaining method, in order to obtain the pixel value of left border of webpage contents. According to the embodiment of the disclosure, for Android system, the webpage content left border pixel value obtaining method could be the foregoing getBlockLeftEdge method or nativeGetBlockLeftEdge method.

Optionally, according to the embodiment of the disclosure, after the pixel value obtaining module 1216 obtains the first pixel value of left border of webpage contents, in the case that the first pixel value of left border of webpage contents is positive or zero, the webpage contents moving module 1218 may move the webpage contents according to the first pixel value. Then, the webpage contents moving module 1218 may record the first pixel value as the reference pixel value of left border of webpage contents in the webpage.

According to the embodiment of the disclosure, the webpage contents moving module 1218 may deliver, as parameters, the pixel value of left border of webpage contents (for example, the foregoing first pixel value), the display zooming scale (for example, the display zooming scale after zooming) and the vertical coordinate pixel value of the lower left vertex of visual area in the webpage (i.e., the foregoing y2) into the visual area moving method, in order to move the webpage contents in a horizontal direction. That is, the position of the visual area is adjusted only in a horizontal direction, while it is kept unchanged in a vertical direction. For Android system, the visual area moving method could be a scrollTo method or a pinScrollTo method.

In the case that the first pixel value is negative, then the pixel value obtaining module 1216, based on the horizontal coordinate pixel value and the vertical coordinate pixel value of the zooming midpoint at the start of zooming operation (for example, (x0, y0) as shown in FIG. 8) and the display zooming scale before zooming, obtain a second pixel value of left border of webpage contents. In the contexts, according to the embodiment of the disclosure, the pixel value obtaining module 1216 may obtain the horizontal coordinate pixel value and the vertical coordinate pixel value of the zooming midpoint at the start of zooming operation and the display zooming scale before zooming in the same manner as the operations as described above and obtain the second pixel value in the same manner as the operations as described above.

Then, in the case that the second pixel value of left border of webpage contents is positive or zero, the webpage contents moving module 1218 may move the webpage contents according to the second pixel value, and record the second pixel value as the reference pixel value of left border of webpage contents in the webpage. According to the embodiment of the disclosure, the webpage contents moving module 1218 may deliver, as parameters, the horizontal coordinate pixel value and the vertical coordinate pixel value of the zooming midpoint at the start of zooming operation and the display zooming scale before zooming into the webpage content left border pixel value obtaining method, in order to obtain the second pixel value of left border of webpage contents. For Android system, the webpage content left border pixel value obtaining method could be the foregoing getBlockLeftEdge method and nativeGetBlockLeftEdge method. According to the embodiment of the disclosure, the webpage contents moving module 1218 may deliver, as parameters, the second pixel value, the display zooming scale after zooming and the vertical coordinate pixel value of the lower left vertex of visual area in the webpage (i.e., the foregoing y2) into the visual area moving method, in order to move the webpage contents in a horizontal direction. That is, the position of the visual area is adjusted only in a horizontal direction, while it is kept unchanged in a vertical direction. For Android system, the visual area moving method could be the foregoing scrollTo method or pinScrollTo method.

When the second pixel value is negative, the webpage contents moving module 1218 may move the webpage contents according to the reference pixel value. Herein, the webpage contents moving module 1218 may deliver, as parameters, the reference pixel value, the display zooming scale e after zooming and the vertical coordinate pixel value of the lower left vertex of visual area in the webpage (i.e., the foregoing y2) into the visual area moving method, in order to move the webpage contents in a horizontal direction. Also, the position of the visual area is adjusted only in a horizontal direction, while it is kept unchanged in a vertical direction. The visual area moving method could be the foregoing scrollTo method or pinScrollTo method.

According to the embodiment of the disclosure, where the pixel value obtaining module 1216 executes the optional operations in relation to the reference pixel value, in the case that the first pixel value of left border of webpage contents is positive or zero, the webpage contents moving module 1218 may record the first pixel value as the reference pixel value of left border of webpage contents in the webpage instead of the reference pixel value obtained in previous operations; in the case that the first pixel value is negative, if the second pixel value of left border of webpage contents is positive or zero, then the webpage contents moving module 1218 may record the second pixel value as the reference pixel value of left border of webpage contents in the webpage instead of the reference pixel value obtained in previous operations. However, if none of above conditions is satisfied, i.e., the first pixel value is negative and the second pixel value is also negative, then reference pixel value obtained in previous operations could be used as the reference pixel value of left border of webpage contents.

Optionally, according to the embodiment of the disclosure, in the case that the first pixel value is negative, before the pixel value obtaining module 1216 obtains the second pixel value, it is also necessary to judge whether the display zooming scale at the end of zooming is more than the display zooming scale before zooming and judge whether the display zooming scale before zooming is more than zero. Only when both judging results are "YES", subsequent operation of obtaining the second pixel value may be executed. Assuming that the screen width is kept unchanged, as soon as zooming is performed on the webpage, the webpage width will be changed and the display zooming scale of webpage display control will be changed accordingly.

Figure 11:
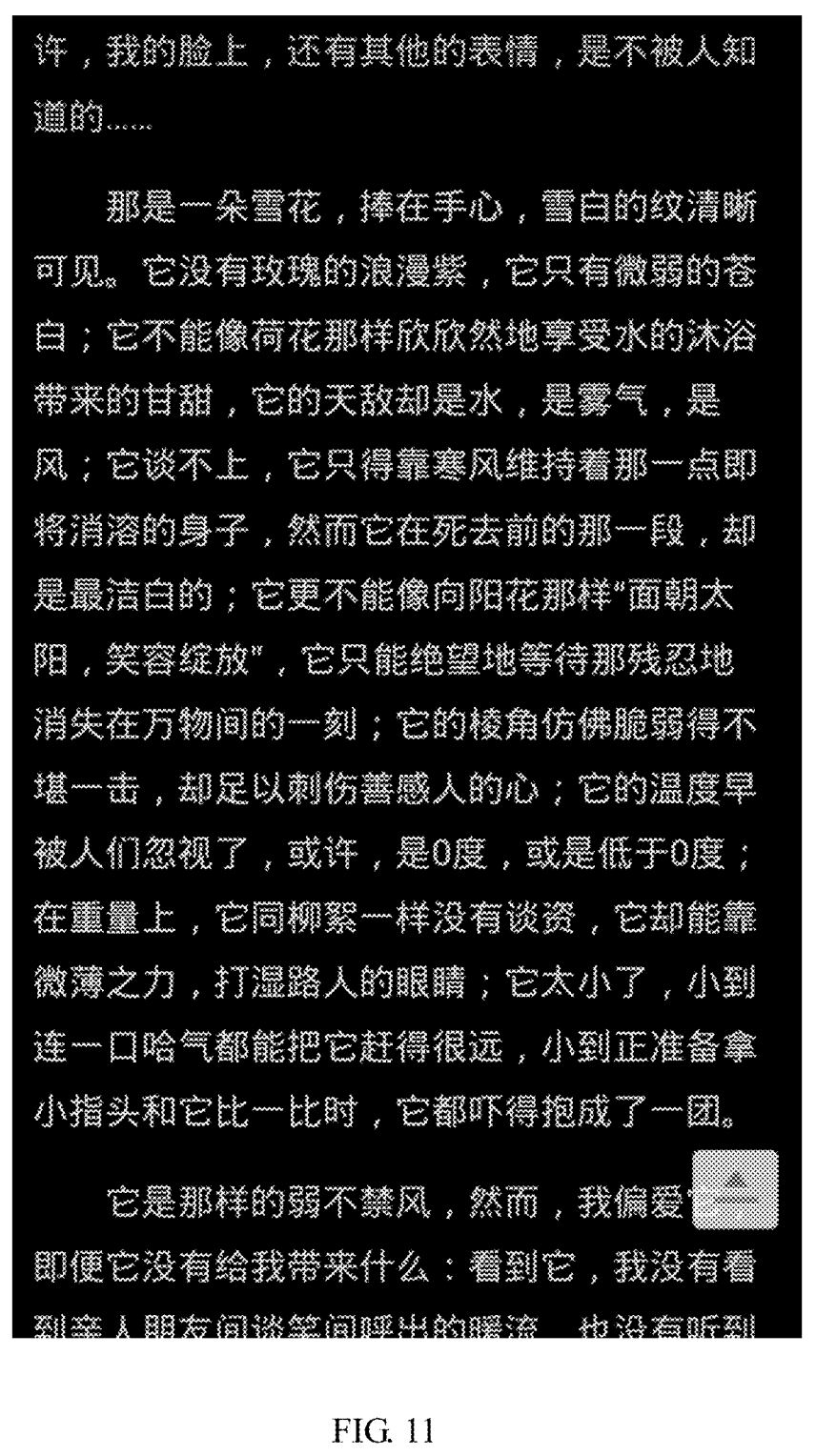

After the device 1200 for webpage zooming and aligning on an electronic apparatus according to the embodiment of the disclosure performs above operations, it may be possible to realize an effect of aligning along the left border of screen after webpage zooming. As shown in FIG. 11, it schematically illustrates a diagram of an aligned webpage after webpage zooming on an electronic apparatus.

Since the various apparatus (device) embodiments as described above corresponds to the foregoing method embodiments, detailed description of the device embodiments will be omitted herein.

Each of components according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of the device for webpage zooming on an electronic apparatus according to the embodiments of the disclosure. The disclosure may further be implemented as equipment or device programs (for example, computer programs and computer program products) for executing some or all of the methods as described herein. The programs for implementing the disclosure may be stored in the computer readable medium, or have a form of one or more signal.

Such a signal may be downloaded from the internet websites, or be provided in carrier, or be provided in other manners.

Figure 13:
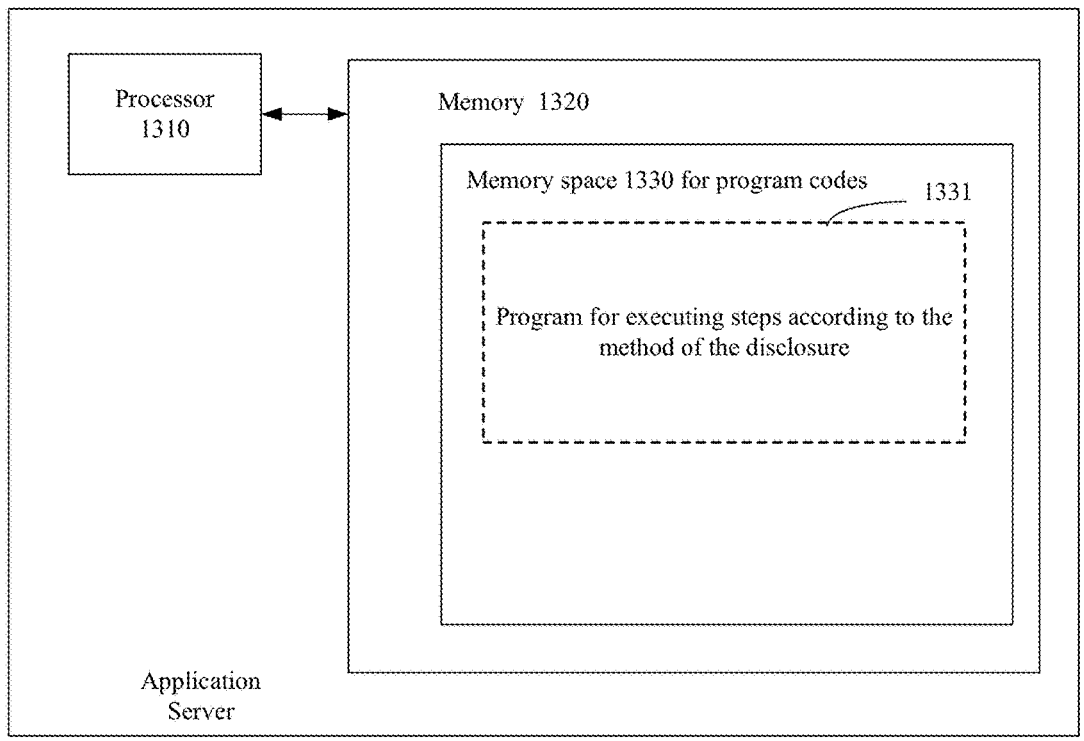
FIG. 13 is a block diagram schematically illustrating a server for executing the method according the disclosure.
Figure 14:
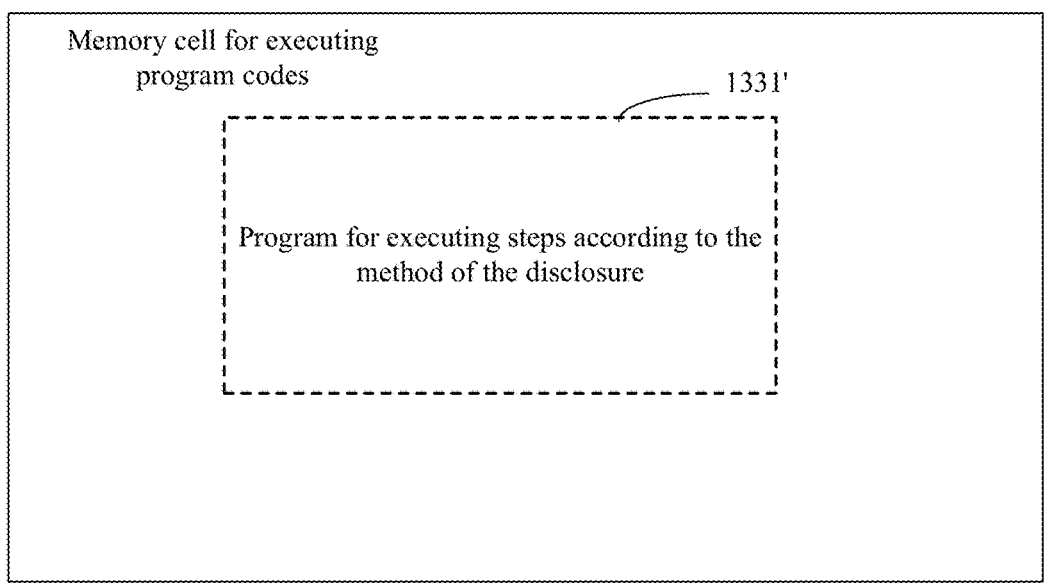
FIG. 14 schematically illustrates a memory cell which is used to store and carry program codes for realizing the method according to the disclosure.

For example, FIG. 13 is a block diagram schematically illustrating a server for realizing the webpage zooming on the electronic apparatus according the disclosure, such as an application server. Traditionally, the server includes a processor 1310 and a computer program product or a computer readable medium in form of a memory 1320. The memory 1320 may be electronic memories such as flash memory, EEPROM (Electrically Erasable Programmable Read-Only Memory), EPROM, hard disk or ROM. The memory 1320 has a memory space 1330 for executing program codes 1331 of respective steps in the above methods. For example, the memory space 1330 for program codes may include respective program codes 1331 for implementing the respective steps in the above mentioned method. These program codes may be read from and/or be written into one or more computer program products. These computer program products include program code carriers such as hard disk, compact disk (CD), memory card or floppy disk. These computer program products are usually the portable or stable memory cells as shown in reference FIG. 14. The memory cells may be provided with memory sections, memory spaces, etc., similar to the memory 1320 of the server as shown in FIG. 13. The program codes may be compressed in an appropriate form. Usually, the memory cell includes computer readable codes 1331' which can be read by processors such as 1310. When these codes are operated on the server, the server may execute respective step as described in the above method.

The "an embodiment", "embodiments" or "one or more embodiments" mentioned in the disclosure means that the specific features, structures or performances described in combination with the embodiment(s) would be included in at least one embodiment. Moreover, it should be noted that, for example, the wording "in an embodiment" herein may necessarily not refer to the same embodiment.

Many details are discussed in the specification provided herein. However, it should be understood that the embodiments of the disclosure can be implemented without these specific details. In some examples, the well-known method, structure and technology are not illustrated in detail, so as to avoid an unclear understanding of the specification.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than for explaining or defining the subject matter of the disclosure. Therefore, it is obvious for an ordinary skilled person in the art that modifications and variations could be made without departing from the scope and spirit of the claims as appended. For the scope of the disclosure, the inventive disclosure is illustrative rather than restrictive, and the scope of the disclosure is defined by the appended claims.

What is claimed is:

1. A method for zooming text content of a webpage in a full screen on an electronic apparatus, which comprises:
   constructing a custom zooming processor object by generating an object of inheritance zooming processor class into which an original zooming processor object is delivered and replacing the original zooming processor object with the custom zooming processor object;
   constructing a custom touch event by inheriting a webpage display control;
   detecting an operation of touching the electronic apparatus as an operation of releasing n−1 touch points in n touch points indicative of an operation of zooming the webpage, wherein n is an integer which is more than or equal to 2;
   determining coordinate values of a first pixel of the webpage based at least on horizontal and vertical coordinate values (x1, y1) of a zooming midpoint in the webpage at an end of zooming the webpage;
   designating the first pixel as a reference pixel of positioning the text content of the webpage in response to a determination that the coordinate values of the first pixel of the webpage are greater than or equal to zero;
   in response to a determination that the coordinate values of the first pixel are less than zero, determining coordinate values of a second pixel of the webpage based at least on original horizontal and vertical coordinate values (x0, x0) of the zooming midpoint at a start of zooming the webpage;
   designating the second pixel as the reference pixel of positioning the text content of the webpage in response to a determination that the coordinate values of the second pixel of the webpage are greater than or equal to zero; and
   assigning a display zooming scale of the webpage display control as a webpage text zooming scale and displaying the text content of the webpage in the full screen of the electronic apparatus.

2. The method according to claim 1, prior to the constructing a custom zooming processor object by generating an object of inheritance zooming processor class into which an original zooming processor object is delivered, obtaining the original zooming processor object, further comprising:
   reflecting and obtaining a zooming detector object from the webpage display control, and reflecting and obtaining an original zooming processor object from the zooming detector object; or
   reflecting and obtaining a zooming manager object from the webpage display control, reflecting and obtaining a zooming detector object from the zooming manager object, and reflecting and obtaining the original zooming processor object from the zooming detector object.

3. The method according to claim 2, wherein the assigning a display zooming scale of the webpage display control as a webpage text zooming scale further comprises:
   reflecting a text zooming scale object from the webpage display control, and assigning the value of the display zooming scale of the webpage display control to the text zooming scale object; or
   reflecting a text zooming scale object from the zooming manager object, and assigning the value of the display zooming scale of the webpage display control to the text zooming scale object.

4. The method according to claim 1, further comprising: enabling a compulsory text composition.

5. The method according to claim 1,
prior to the assigning a display zooming scale of the webpage display control as a webpage text zooming scale, further comprising setting a value of whether to enable widescreen viewing object to be "false"; and
after the assigning a display zooming scale of the webpage display control as a webpage text zooming scale, further comprising setting the value of whether to enable widescreen viewing object to be "true".

6. The method according to claim 1, further comprising:
constructing a custom webpage render processor object by obtaining an original webpage render processor object of the webpage display control and generating an object of inherited event processor class into which an original webpage render processor object of the webpage display control is delivered, and replacing the original webpage render processor object of the webpage display control with the custom webpage render processor object; and
obtaining coordinate values of pixels on a left border of the text content of the webpage, moving the text content of the webpage according to the coordinate values of pixels on the left border of the text content of the webpage and invoking the original webpage render processor object for processing.

7. The method according to claim 1, further comprising:
obtaining horizontal and vertical coordinate values of the zooming midpoint in a display area by reflecting a zooming midpoint horizontal-coordinate pixel value method and a zooming midpoint vertical-coordinate pixel value method from the zooming manager object;
obtaining horizontal and vertical coordinate pixel values of a lower left vertex of the display area in the webpage by invoking a display area horizontal-coordinate pixel value obtaining method and a display area vertical-coordinate pixel value obtaining method of the webpage display control;
obtaining the horizontal coordinate value of the zooming midpoint in the webpage and the vertical coordinate pixel value of the zooming midpoint in the webpage by reflecting a content horizontal-coordinate pixel value obtaining method and a content vertical-coordinate pixel value obtaining method from the webpage display control and adding the horizontal and vertical coordinate values of the zooming midpoint in the display area to the horizontal and vertical coordinate values of the lower left vertex of the display area in the webpage, respectively; and
obtaining the display zooming scale by invoking a display zooming scale obtaining method of the webpage display control
determining coordinate values of the reference pixel and pixels on the left border of the text content of the webpage based on the horizontal coordinate value of the zooming midpoint in the webpage, the vertical coordinate value of the zooming midpoint in the webpage and the display zooming scale.

8. The method according to claim 7, wherein the displaying the text content of the webpage in the full screen of the electronic apparatus is based on the reference pixel of the webpage, the display zooming scale and the coordinate values of the lower left vertex of the display area in the webpage.

9. An electronic apparatus for webpage zooming, comprising:
a memory having instructions stored thereon;
a processor configured to execute the instructions to perform operations for webpage zooming, comprising:
constructing a custom zooming processor object by generating an object of inheritance zooming processor class into which an original zooming processor object is delivered and replacing the original zooming processor object with the custom zooming processor object;
constructing a custom touch event by inheriting a webpage display control;
detecting an operation of touching the electronic apparatus as an operation of releasing n−1 touch points in n touch points indicative of operations of zooming the webpage, wherein n is an integer which is more than or equal to 2;
determining coordinate values of a first pixel of the webpage based at least on horizontal and vertical coordinate values (x1, y1) of a zooming midpoint at an end of zooming the webpage;
designating the first pixel as a reference pixel of positioning text content of the webpage in response to a determination that the coordinate values of the first pixel of the webpage are greater than or equal to zero;
in response to a determination that the coordinate values of the first pixel are less than zero, determining coordinate values of a second pixel of the webpage based at least on original horizontal and vertical coordinate values (x0, x0) of the zooming midpoint at a start of zooming the webpage;
designating the second pixel as the reference pixel of positioning text content of the webpage in response to a determination that the coordinate values of the second pixel of the webpage are greater than or equal to zero; and
assigning a display zooming scale of the webpage display control as a webpage text zooming scale and displaying the text content of the webpage in the full screen of the electronic apparatus.

10. The electronic apparatus according to claim 9, wherein the processor is configured to perform: prior to the constructing a custom zooming processor object by generating an object of inheritance zooming processor class into which an original zooming processor object is delivered, obtaining the original zooming processor object, wherein
reflecting and obtaining a zooming detector object from the webpage display control, and reflecting and obtaining an original zooming processor object from the zooming detector object; or
reflecting and obtaining a zooming manager object from the webpage display control, reflecting and obtaining a zooming detector object from the zooming manager object, and reflecting and obtaining the original zooming processor object from the zooming detector object.

11. The electronic apparatus according to claim 10, wherein the assigning a display zooming scale of the webpage display control as a webpage text zooming scale further comprises:
reflecting a text zooming scale object from the webpage display control, and assigning the value of the display zooming scale of the webpage display control to the text zooming scale object; or
reflecting a text zooming scale object from the zooming manager object, and assigning the value of the display zooming scale of the webpage display control to the text zooming scale object.

12. The electronic apparatus according to claim 9, wherein the processor is further configured to perform:
before the assigning a display zooming scale of the webpage display control as a webpage text zooming scale, setting a value of whether to enable widescreen viewing object to be "false"; after the assigning a display zooming scale of the webpage display control as a webpage text zooming scale, setting the value of whether to enable widescreen viewing object to be "true".

13. The electronic apparatus according to claim 9, wherein the processor is further configured to perform:
constructing a custom webpage render processor object by obtaining an original webpage render processor object of the webpage display control and generating an object of inherited event processor class into which an original webpage render processor object of the webpage display control is delivered, and replacing the original webpage render processor object of the webpage display control with the custom webpage render processor object;
obtaining coordinate values of pixels on a left border of the text content of the webpage; and
moving the text content of the webpage according to the coordinate values of pixels on the left border of the text content of the webpage, and invoking the original webpage render processor object for processing.

14. The electronic apparatus according to claim 9, further comprising:
obtaining horizontal and vertical coordinate values of the zooming midpoint in a display area by reflecting a zooming midpoint horizontal-coordinate pixel value method and a zooming midpoint vertical-coordinate pixel value method from the zooming manager object;
obtaining horizontal and vertical coordinate pixel values of a lower left vertex of the display area in the webpage by invoking a display area horizontal-coordinate pixel value obtaining method and a display area vertical-coordinate pixel value obtaining method of the webpage display control;
obtaining the horizontal coordinate value of the zooming midpoint in the webpage and the vertical coordinate pixel value of the zooming midpoint in the webpage by reflecting a content horizontal-coordinate pixel value obtaining method and a content vertical-coordinate pixel value obtaining method from the webpage display control and adding the horizontal and vertical coordinate values of the zooming midpoint in the display area to the horizontal and vertical coordinate values of the lower left vertex of the display area in the webpage, respectively;
obtaining the display zooming scale by invoking a display zooming scale obtaining method of the webpage display control
determining coordinate values of the reference pixel and pixels on the left border of the text content of the webpage based on the horizontal coordinate value of the zooming midpoint in the webpage, the vertical coordinate value of the zooming midpoint in the webpage and the display zooming scale.

15. The electronic apparatus according to claim 14, wherein the displaying the text content of the webpage in the full screen of the electronic apparatus is based at least on stored coordinate values of pixels on the left border of the text content of the webpage, the display zooming scale and the coordinate values of the lower left vertex of the display area in the webpage.

16. A non-transitory computer readable medium, having computer programs stored thereon that, when executed by one or more processors of an electronic apparatus, cause the electronic apparatus to perform:
constructing a custom zooming processor object by generating an object of inheritance zooming processor class into which an original zooming processor object is delivered and replacing the original zooming processor object with the custom zooming processor object;
constructing a custom touch event by inheriting a webpage display control;
detecting an operation of touching the electronic apparatus as an operation of releasing n−1 touch points in n touch points indicative of operations of zooming the webpage, wherein n is an integer which is more than or equal to 2;
determining coordinate values of a first pixel of the webpage based at least on horizontal and vertical coordinate values (x1, y1) of a zooming midpoint in the webpage at an end of zooming the webpage;
designating the first pixel as a reference pixel of positioning the text content of the webpage in response to a determination that the coordinate values of the first pixel of the webpage are greater than or equal to zero;
in response to a determination that the coordinate values of the first pixel are less than zero, determining coordinate values of a second pixel of the webpage based at least on original horizontal and vertical coordinate values (x0, x0) of the zooming midpoint at a start of zooming the webpage;
designating the second pixel as the reference pixel of positioning the text content of the webpage in response to a determination that the coordinate values of the second pixel of the webpage are greater than or equal to zero; and
assigning a display zooming scale of the webpage display control as a webpage text zooming scale and displaying the text content of the webpage in the full screen of the electronic apparatus.

* * * * *